(12) United States Patent
Xiao et al.

(10) Patent No.: US 11,791,551 B2
(45) Date of Patent: Oct. 17, 2023

(54) ANTENNA SYSTEM AND WIRELESS DEVICE

(71) Applicant: HUAWEI TECHNOLOGIES CO., LTD., Guangdong (CN)

(72) Inventors: Shuguang Xiao, Nanjing (CN); Jie Zhao, Nanjing (CN); Xiao Zhou, Shanghai (CN); Xin Luo, Chengdu (CN); Yi Chen, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/318,646

(22) Filed: May 12, 2021

(65) Prior Publication Data
US 2021/0359407 A1    Nov. 18, 2021

(30) Foreign Application Priority Data
May 13, 2020    (CN) .......................... 202010403893.X

(51) Int. Cl.
*H01Q 1/52*    (2006.01)
*H01Q 5/48*    (2015.01)
(Continued)

(52) U.S. Cl.
CPC ............... *H01Q 1/525* (2013.01); *H01Q 5/48* (2015.01); *H01Q 7/00* (2013.01); *H01Q 9/0485* (2013.01); *H04B 1/525* (2013.01)

(58) Field of Classification Search
CPC ............ H01Q 1/525; H01Q 5/48; H01Q 7/00; H01Q 9/0485; H01Q 21/28; H01Q 25/001;
(Continued)

(56) References Cited

U.S. PATENT DOCUMENTS 5,952,971 A  *  9/1999  Strickland ............ H01Q 21/065
                                                            343/741
2002/0089461 A1*  7/2002  Mimura ................. H01Q 9/265
                                                            343/742
(Continued)

FOREIGN PATENT DOCUMENTS

CN          104319479 A       1/2015
CN          104937774 A       9/2015
(Continued)

OTHER PUBLICATIONS

Vemuri.Sarah Sanhitha et al.,"Design and analysis of a wide band dual circularly polarized dielectric resonator antenna",2018 IEEE,total 4 pages.

*Primary Examiner* — Hai V Tran
*Assistant Examiner* — Michael M Bouizza
(74) *Attorney, Agent, or Firm* — WOMBLE BOND DICKINSON (US) LLP

(57) ABSTRACT

This application provides an antenna system and a wireless device, and pertains to the field of communications technologies. In this application, a decoupling resonator is connected to a first antenna, and a resonance frequency of the decoupling resonator is within an operating frequency band of a second antenna, so that the decoupling resonator can resonate within the operating frequency band of the second antenna. The decoupling resonator reduces coupling between the first antenna and the second antenna, and isolation between the first antenna and the second antenna is improved.

20 Claims, 19 Drawing Sheets

(51) Int. Cl.
*H01Q 7/00* (2006.01)
*H01Q 9/04* (2006.01)
*H04B 1/525* (2015.01)

(58) Field of Classification Search
CPC ........ H01Q 1/521; H01Q 21/24; H01Q 1/241; H01Q 1/243; H04B 1/525
See application file for complete search history.

(56) References Cited

U.S. PATENT DOCUMENTS

| | | | |
|---|---|---|---|
| 2009/0207092 A1 | 8/2009 | Nysen et al. | |
| 2015/0015448 A1 | 1/2015 | Almog | |
| 2016/0285161 A1 | 9/2016 | Apaydin et al. | |
| 2018/0342807 A1 | 11/2018 | Watson et al. | |
| 2020/0212585 A1* | 7/2020 | Chayat | H01Q 5/25 |

FOREIGN PATENT DOCUMENTS

| CN | 106571526 A | 4/2017 |
|---|---|---|
| CN | 110301069 A | 10/2019 |

* cited by examiner

ANTENNA SYSTEM AND WIRELESS DEVICE

CROSS-REFERENCE TO RELATED APPLICATION

This patent application claims priority, under 35 U.S.C. § 119, of Chinese Patent Application No. 202010403893.X, filed May 13, 2020, which is incorporated by reference in its entirety.

TECHNICAL FIELD

This application relates to the field of communications technologies, and in particular, to an antenna system and a wireless device.

BACKGROUND

Multiple-input multiple-output (MIMO) is a key technology in the wireless communications field, and can effectively increase a channel capacity. With development of the MIMO technology, an increasing quantity of antennas are integrated into a device, so that the MIMO technology is effectively implemented through cooperation of a plurality of antennas.

For example, an antenna system including a plurality of antennas may be designed in a common aperture manner. Specifically, a horizontal polarization antenna and a vertical polarization antenna are stacked in a vertical direction, so that substrates and microstrip circuits of the horizontal polarization antenna and the vertical polarization antenna are stacked (the horizontal polarization antenna is up and the vertical polarization antenna is down). An antenna system disposed in this manner may be referred to as a common aperture antenna system. By using the common aperture manner, an area occupied by the antenna system can be reduced. In addition, this manner has an advantage of polarization diversity of an antenna, and can improve MIMO performance.

However, in a simple common aperture antenna system, the horizontal polarization antenna and the vertical polarization antenna are strongly coupled, that is, isolation between the two antennas is relatively poor.

SUMMARY

This application provides an antenna system and a wireless device, and can improve isolation between antennas. The technical solutions are as follows.

According to a first aspect, an antenna system is provided. The antenna system includes a first antenna and a second antenna that are vertically stacked. The first antenna and the second antenna have different polarization directions. The first antenna is connected to a decoupling resonator. A resonance frequency of the decoupling resonator is within an operating frequency band of the second antenna, to reduce coupling between the first antenna and the second antenna.

In the antenna system provided in this application, the decoupling resonator is connected to the first antenna, and the resonance frequency of the decoupling resonator is within the operating frequency band of the second antenna, so that the decoupling resonator can resonate within the operating frequency band of the second antenna. Therefore, for a current that is in the operating frequency band of the second antenna and that is generated by the first antenna, the decoupling resonator is a short circuit, so that the current that is in the operating frequency band of the second antenna and that is generated by the first antenna is more likely to flow to the decoupling resonator rather than the second antenna. Because a current between the first antenna and the second antenna is interfered, the coupling between the first antenna and the second antenna is reduced, and isolation between the first antenna and the second antenna is improved. In addition, this structure is applicable to a case in which the first antenna and the second antenna are vertically stacked. Therefore, this helps reduce an overall size of the antenna system, and helps improve isolation of the antenna system while achieving miniaturization.

In one embodiment, polarization directions of the first antenna and the second antenna are orthogonal.

In one embodiment, the first antenna is a horizontal polarization antenna, and the second antenna is a vertical polarization antenna.

The decoupling resonator is loaded on the horizontal polarization antenna, so that a circuit for suppressing mutual coupling between the horizontal polarization antenna and the vertical polarization antenna is added. Therefore, a technical problem that isolation is insufficient when the horizontal polarization antenna and the vertical polarization antenna work in different frequency bands or in a same frequency band is resolved, and isolation between the horizontal polarization antenna and the vertical polarization antenna is effectively improved. In addition, the decoupling resonator is disposed on the horizontal polarization antenna, and this helps avoid affecting operation of the vertical polarization antenna.

In one embodiment, the decoupling resonator is connected to a feedpoint of the first antenna.

Because the decoupling resonator is connected to the feedpoint of the first antenna, a capability of current conduction between the decoupling resonator and the first antenna can be improved, thereby improving a decoupling effect.

In one embodiment, the decoupling resonator is a stepped impedance resonator.

The stepped impedance resonator is used to implement the decoupling resonator, so that an inter-frequency decoupling effect can be achieved, and isolation between two antennas when the two antennas work in different frequency bands can be improved.

In one embodiment, the first antenna includes at least one of a dipole antenna or a loop antenna, the first antenna includes an arm, and a longitudinal width of the stepped impedance resonator is greater than a width of the arm of the first antenna.

Because the longitudinal width of the stepped impedance resonator is wider than that of the arm of the first antenna, the stepped impedance resonator has a low impedance characteristic compared with the arm of the first antenna. This helps improve the decoupling effect.

In one embodiment, a transverse length of the stepped impedance resonator is 0.1 to 0.4 times an operating wavelength of the first antenna or the second antenna.

When the transverse length of the stepped impedance resonator is approximately 0.25 times the operating wavelength of the first antenna, a capacitance value of a capacitance to ground equivalent to the stepped impedance resonator is set to a maximum value, so that an equivalent circuit of the stepped impedance resonator has a large-capacitance grounding effect, thereby enhancing a resonance mode between the first antenna and the second antenna, in other words, improving the isolation between the first antenna and the second antenna, and implementing more effective decoupling.

In one embodiment, the decoupling resonator is a ring resonator.

The ring resonator is used to implement the decoupling resonator, so that an inter-frequency decoupling effect can be achieved, and isolation between two antennas when the two antennas work in different frequency bands can be improved.

In one embodiment, a circumference of the ring resonator is 0.8 to 1.2 times an operating wavelength of the first antenna or the second antenna.

When the transverse length of the ring resonator is approximately 1 times the operating wavelength of the first antenna, the ring resonator can resonate at a corresponding frequency, to create a current loop, so that a new resonance mode is generated between the first antenna and the second antenna, in other words, the isolation between the first antenna and the second antenna is improved, so that more effective decoupling is implemented. The corresponding frequency is a frequency in a target frequency band, and the corresponding frequency is, for example, a frequency in the operating frequency band of the vertical polarization antenna (the second antenna).

In one embodiment, the decoupling resonator includes a transmission line and an open-circuit stub, and the open-circuit stub is connected to an end of the transmission line.

An open-circuit stub with a specific length has an effect of forming series LC (the letter L represents an inductor, and the letter C represents a capacitor) resonance, and a transmission line with a specific length also has an effect of forming series LC resonance. After an end of the transmission line is short-circuited and then the open-circuit stub is loaded, the decoupling resonator can be formed, and a stronger series LC resonance effect can be achieved. Therefore, the decoupling resonator with this structure can implement decoupling. In addition, the decoupling resonator of this structure can achieve an inter-frequency decoupling effect, and isolation between two antennas when the two antennas work in different frequency bands can be improved.

In one embodiment, a total transverse length of the transmission line and the open-circuit stub is 0.8 to 1.2 times an operating wavelength of the first antenna or the second antenna.

When the total transverse length of an open ended stub and the transmission line is approximately equal to an operating wavelength in a medium of the first antenna, the decoupling resonator can resonate at a corresponding frequency, a resonance mode between the first antenna and the second antenna is enhanced, and an LC resonance effect formed by the decoupling resonator has a good decoupling effect.

In one embodiment, the decoupling resonator includes a plurality of open-circuit stubs connected in parallel and a transmission line, and each of the plurality of open-circuit stubs is connected to an end of the transmission line.

The transmission line and the plurality of open-circuit stubs disposed at the end of the transmission line are used to implement the decoupling resonator, so that an intra-frequency decoupling effect can be achieved, and isolation between two antennas when the two antennas work in a same frequency band can be improved.

In one embodiment, the plurality of open-circuit stubs include a first open-circuit stub and a second open-circuit stub, a total transverse length of the transmission line and the first open-circuit stub is 0.8 to 1.2 times an operating wavelength of the first antenna, and a total transverse length of the transmission line and the second open-circuit stub is 0.8 to 1.2 times an operating wavelength of the second antenna.

Coupling of frequencies in the operating frequency band of the first antenna can be suppressed by using a structure of the transmission line and the first open-circuit stub, and coupling of frequencies in the operating frequency band of the second antenna can be suppressed by using a structure of the transmission line and the second open-circuit stub. Therefore, the coupling of the frequencies of the first antenna and the coupling of the frequencies of the second antenna can be suppressed, so that a better decoupling effect is achieved.

In one embodiment, the transmission line is a coplanar stripline or a slotline.

By disposing one or more open-circuit stubs at an end of the coplanar stripline, a stub loaded coplanar stripline (Stub loaded Coplanar Stripline, SLCPS) resonator is formed, and the SLCPS resonator can achieve a good decoupling effect. In addition, the coplanar stripline or the slotline is used to implement a decoupling resonator, so that costs can be reduced while isolation between antennas is improved.

According to a second aspect, a wireless device is provided. The wireless device includes the antenna system according to the first aspect or any embodiment of the first aspect.

REFERENCE NUMERALS

Figure 1:
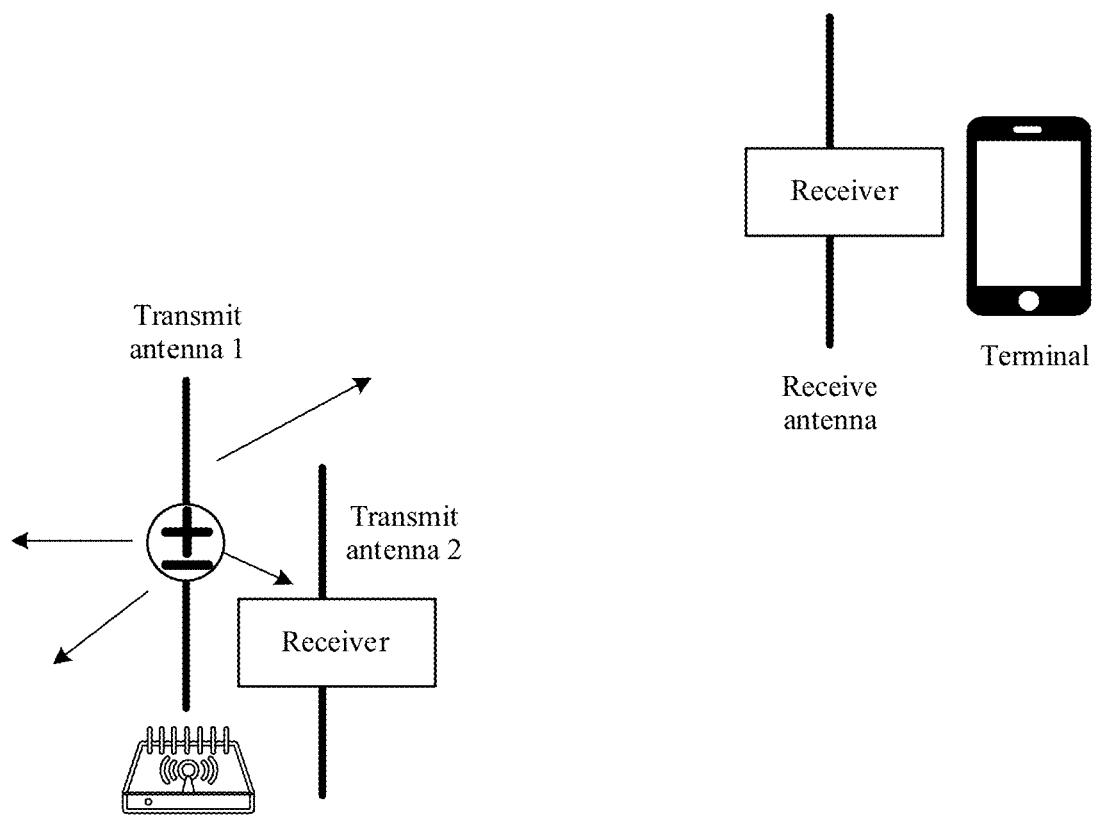
FIG. 1 is a diagram of an application scenario according to an embodiment of this application.

- 10: Antenna system
- 11: First antenna
- 12: Second antenna
- 112: Dipole antenna
- 113: Loop antenna
- 1121: First arm
- 1122: Second arm
- 114: First substrate
- 124: Second substrate
- 115: Feedpoint of the first antenna
- 125: Feedpoint of the second antenna
- 116: Coplanar stripline
- 131: First reflector
- 132: Second reflector
- 133: Third reflector
- 134: Fourth reflector
- 14: Radome
- 141: First layer of the radome
- 142: Second layer of the radome
- 15: Ground
- 111: A decoupling resonator implemented by using an SIR
- 111*b*: A decoupling resonator implemented by using an RR
- 111*c*: A decoupling resonator implemented by using an SLCPS
- 1131: A CPS in the decoupling resonator
- 1132: An open-circuit stub in the decoupling resonator
- 114: Another decoupling resonator implemented by using the SLCPS
- 1141: A CPS in the another decoupling resonator
- 1142: One open-circuit stub in the decoupling resonator
- 1143: Another open-circuit stub in the decoupling resonator
- 1144: Another open-circuit stub in the decoupling resonator

DESCRIPTION OF EMBODIMENTS

To make the objectives, technical solutions, and advantages of this application clearer, the following further describes the implementations of this application in detail with reference to the accompanying drawings.

For ease of understanding, the following describes several terms appearing in the embodiments of this application.

A coplanar stripline (CPS) includes two coplanar parallel lines, and widths of the two lines in the CPS may be equal.

An operating wavelength in a medium refers to a wavelength obtained when an electromagnetic wave generated by an antenna is transmitted in the medium. For example, the operating wavelength in the medium is determined according to the following formula (1).

$$\lambda = \frac{1}{f\sqrt{\mu^* \varepsilon_{\mathit{eff}}}} \qquad \text{Formula (1)}$$

In the formula (1), $\lambda$ represents an operating wavelength in a medium, f represents a frequency of an electromagnetic wave, $\mu$ represents a magnetic permeability, and $\varepsilon_{\mathit{eff}}$ represents an effective dielectric constant of a substrate in an antenna.

An open-circuit stub is a stub whose end is in an open-circuit state.

An antenna system and a wireless device provided in the embodiments of this application can be applied to a scenario in which wireless communication is performed based on MIMO. The following briefly describes an application scenario.

With the large-scale popularization of mobile terminals, wireless communications technologies have developed rapidly. The MIMO is a key technology for wireless communications. The MIMO can effectively increase a channel capacity, and is widely used in recent years. Typically, with the development of wireless local area networks (WLAN) and mobile communication technologies that have become popular in recent years, the MIMO technology, especially a quantity of antennas, in a wireless device is multiplied. However, because a size of an entire access point (AP) device is limited, a larger quantity of antennas indicates a smaller antenna spacing. In this case, isolation between antennas is poorer, and consequently the channel capacity is reduced.

FIG. 1 shows an intuitive meaning of isolation of an antenna system. An AP device configured with a multi-antenna system is shown in the lower left part of FIG. 1. The multi-antenna system in the AP device includes a transmit antenna 1 and a transmit antenna 2. A terminal located far away from the AP device is shown in the upper right part of FIG. 1. The terminal includes a receive antenna. If the transmit antenna 1 and the transmit antenna 2 on the AP device are strongly coupled, in other words, isolation between the transmit antenna 1 and the transmit antenna 2 is relatively poor, severe mutual coupling is caused. Consequently, communication between the AP device and the terminal is damaged to some extent, and a channel capacity is reduced.

For an antenna system in the AP device based on WLAN communication, there are two implementations to improve isolation between antennas. In implementation A, the isolation between adjacent antennas is improved by increasing antenna spacing. In implementation B, polarization diversity is used to improve the isolation between antennas, to be specific, principal polarization manners of adjacent antennas are set to enable the adjacent antennas to be orthogonal to each other. However, the implementation A causes an excessively large volume of the AP device, and is limited by a length, a width, and a height of the AP device. This is not conducive to miniaturization of the antenna. The implementation B has a limited capability of improving isolation, and cannot meet an actual service requirement. Therefore, neither the implementation A nor the implementation B can greatly improve the isolation between antennas. Due to a limitation of an overall size of the AP device, even if the implementation A and the implementation B are used together, relatively good isolation still cannot be obtained.

In some embodiments of this application, a decoupling resonator is loaded on an antenna, to implement an apparatus for improving the isolation between antennas, thereby resolving a problem that the isolation between antennas is insufficient when a size of an antenna device such as the AP device is limited. The following describes in detail the technical solutions provided in the embodiments of this application.

Figure 2:
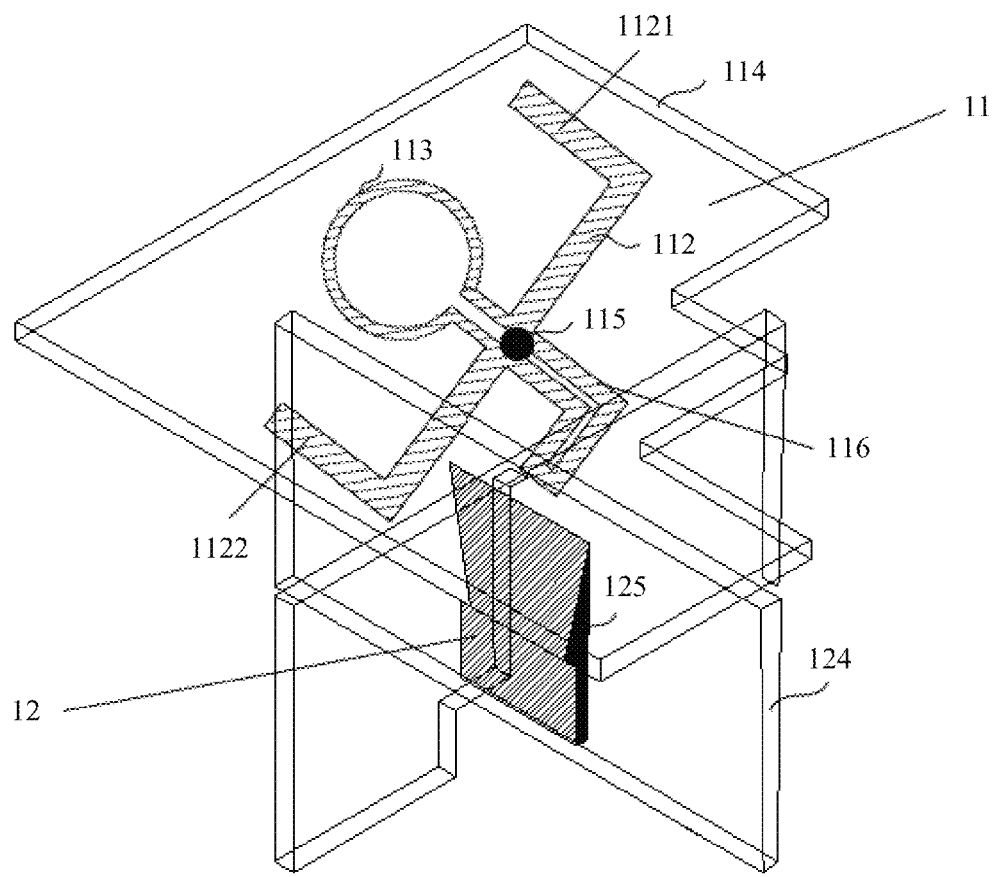
FIG. 2 is a structural diagram of an antenna system according to an embodiment of this application.
Figure 3:
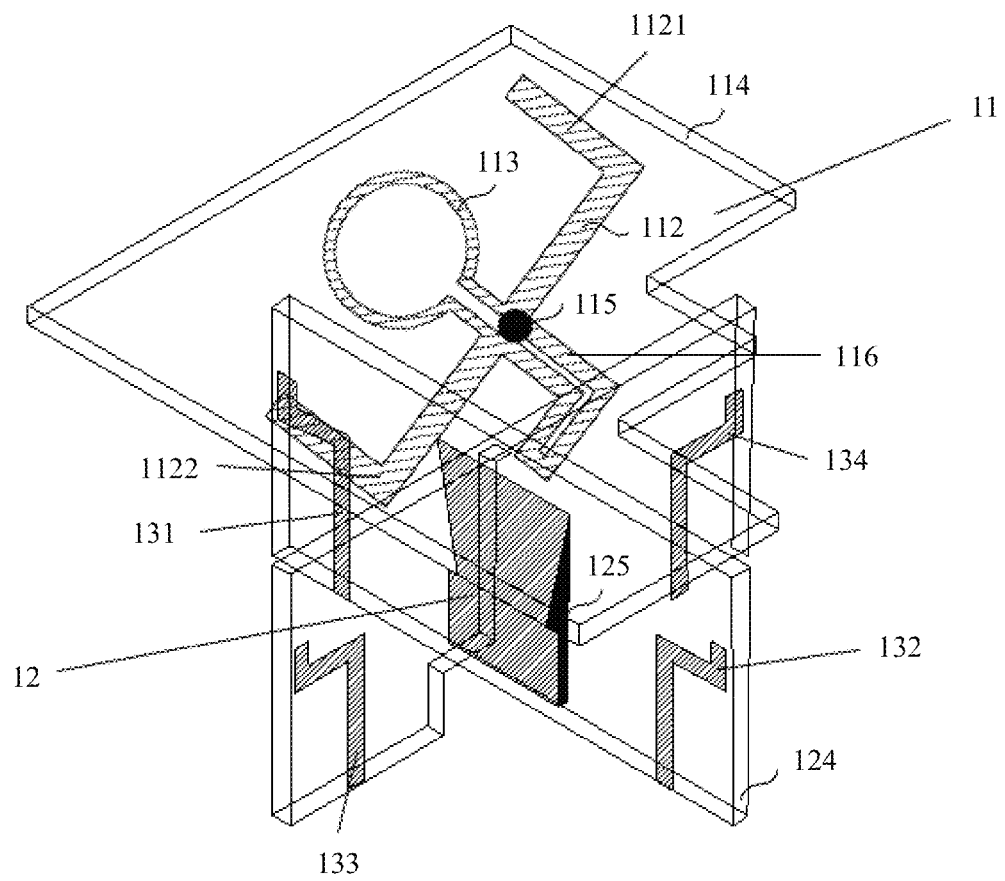
FIG. 3 is a structural diagram of an antenna system according to an embodiment of this application.
Figure 4:
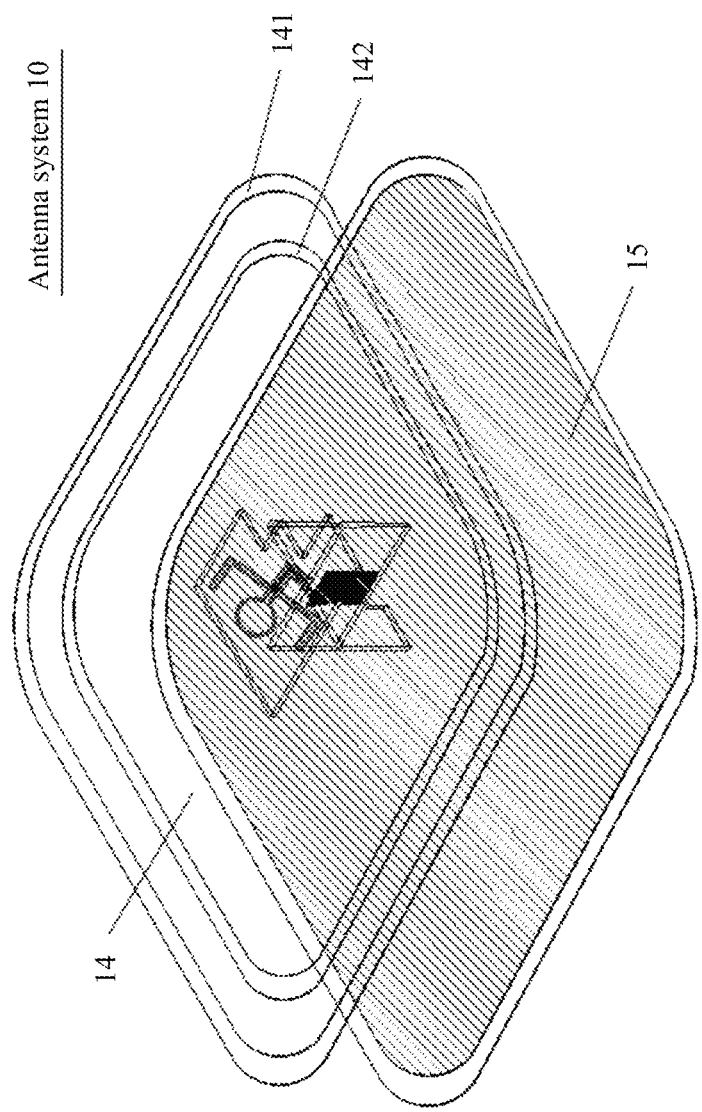
FIG. 4 is a structural diagram of an antenna system according to an embodiment of this application.

Referring to FIG. 2 to FIG. 4, the embodiments provide an antenna system 10. The antenna system 10 is a multi-antenna system. The antenna system 10 includes at least two antennas. For example, refer to FIG. 2 or FIG. 3. The antenna system 10 includes a first antenna 11 and a second antenna 12.

The first antenna 11 and the second antenna 12 have different polarization directions. In one embodiment, the polarization directions of the first antenna 11 and the second antenna 12 are orthogonal. For example, a polarization direction of the first antenna 11 or the second antenna 12 is a horizontal polarization direction or a vertical polarization direction. In one embodiment, the antenna system 10 is a dual-polarized antenna system. The first antenna 11 is a horizontal polarization antenna, and the second antenna 12 is a vertical polarization antenna.

In one embodiment, the first antenna 11 and the second antenna 12 are antennas operating in different frequency bands. An operating frequency band of the first antenna 11 is different from an operating frequency band of the second antenna 12. Alternatively, the first antenna 11 and the second antenna 12 are antennas operating in a same frequency band. An operating frequency band of the first antenna 11 is the same as an operating frequency band of the second antenna 12.

An antenna type of the first antenna 11 includes a plurality of cases. In one embodiment, the first antenna 11 includes at least one of a dipole antenna or a loop antenna. Specifically, the first antenna 11 is the dipole antenna. Alternatively, the first antenna 11 is the loop antenna. Alternatively, the first antenna 11 is a combination of the dipole antenna and the loop antenna, in other words, the first antenna 11 includes the dipole antenna and the loop antenna, and the dipole antenna is connected to the loop antenna.

In one embodiment, the first antenna 11 is a dual-band antenna. The first antenna 11 works on a first operating band and a second operating band. The first operating band and the second operating band are two different bands. For example, the first antenna 11 includes a dipole antenna and a loop antenna, the first operating frequency band is an operating frequency band of the dipole antenna, and the second operating frequency band is an operating frequency band of the loop antenna.

The first antenna 11 includes a plurality of arms. For example, the first antenna 11 includes a first arm 1121 and a second arm 1122. When the first antenna 11 includes the dipole antenna, the first arm 1121 and the second arm 1122 are, for example, two arms in symmetrical positions in the dipole antenna. When the first antenna 11 includes the loop antenna 113, the first arm 1121 and the second arm 1122 are, for example, two arms that form the loop antenna 113. The first arm 1121 and the second arm 1122 are connected to form a loop. In one embodiment, an operating frequency band of the first arm 1121 is approximately 2.4 GHz, and an operating frequency band of the second arm 1122 is approximately 2.4 GHz. It should be noted that the first arm 1121 and the second arm 1122 are optional elements of the first antenna. In some other embodiments, the first antenna does not include the two arms.

The first antenna 11 includes a first substrate 114. The second antenna 12 includes a second substrate 124.

In one embodiment, referring to FIG. 2 or FIG. 3, the antenna system 10 shown in FIG. 2 or FIG. 3 is a dual-polarized antenna system. The first antenna 11 is a horizontal polarization antenna. The horizontal polarization antenna shown in FIG. 2 or FIG. 3 includes the dipole antenna 112 and the loop antenna 113. The dipole antenna 112 and the loop antenna 113 are connected at a feedpoint. The horizontal polarization antenna is a dual-band antenna. An operating frequency band of the dipole antenna 112 is 2.4 GHz to 2.484 GHz (Ghz, a unit of frequency), and an operating frequency band of the loop antenna 113 is 6.1 GHz to 6.8 GHz.

The first antenna 11 includes a feedpoint 115. A position of the feedpoint 115 of the first antenna 11 includes a plurality of cases. For example, refer to FIG. 2 or FIG. 3. The feedpoint 115 of the first antenna 11 in FIG. 2 or FIG. 3 illustrates the position of the feedpoint of the horizontal polarization antenna (the first antenna 11). The feedpoint 115 of the first antenna 11 is located in a common part of the loop antenna 113 and the dipole antenna 112, and the loop antenna 113 and the dipole antenna 112 share the feedpoint 115 of the first antenna 11. In other words, both the loop antenna 113 and the dipole antenna 112 are fed through the feedpoint 115 of the first antenna 11. The feedpoint 115 of the first antenna 11 is welded to a coaxial line, and the horizontal polarization antenna is fed by welding the coaxial line.

The first antenna 11 is connected to a coplanar stripline 116. For example, after an end of the coplanar stripline 116 is short-circuited or open-circuited, the coplanar stripline 116 is connected to an end of the horizontal polarization antenna. The coplanar stripline 116 with a short circuit or an open circuit at the end may also be referred to as a balun. For example, refer to FIG. 2 or FIG. 3. The coplanar stripline 116 shown in FIG. 2 or FIG. 3 has a bent shape similar to a U shape. The coplanar stripline 116 shown in FIG. 2 or FIG. 3 may be referred to as a U-shaped balun.

An antenna type of the second antenna 12 includes a plurality of cases. In one embodiment, the second antenna 12 is a monopole antenna. Alternatively, the second antenna 12 is a dipole antenna 112. For example, refer to FIG. 2 or FIG. 3. FIG. 2 or FIG. 3 illustrates that the second antenna 12 is the vertical polarization antenna and the second antenna 12 is the monopole antenna. The second antenna 12 shown in FIG. 2 or FIG. 3 has an approximate trapezoid shape. An operating frequency band of the monopole antenna is 5.15 GHz to 5.85 GHz. A position of a ground 15 of the monopole antenna is described below with reference to FIG. 4.

The second antenna 12 includes a feedpoint 125. A position of the feedpoint 125 of the second antenna 12 includes a plurality of cases. For example, refer to FIG. 2 or FIG. 3. The feedpoint 125 of the second antenna 12 in FIG. 2 or FIG. 3 is used as an example to describe the position of the feedpoint of the vertical polarization antenna (the second antenna 12). The feedpoint 125 of the second antenna 12 is located in a metal patch on the back of the trapezoid. The vertical polarization antenna is coupled from a reverse side through the metal patch to feed. The metal patch in which the feedpoint 125 of the second antenna 12 is located extends from a coplanar waveguide (coplanar waveguide, CPW) on the ground 15. The coplanar waveguide is also fed by using a coaxial line.

The first antenna 11 and the second antenna 12 are vertically stacked. Specifically, the first antenna 11 is horizontally placed, and the second antenna 12 is vertically placed. For example, the first antenna 11 is superimposed on the second antenna 12. The first antenna 11 (for example, the horizontal polarization antenna) is above the second antenna 12 (for example, the vertical polarization antenna). In one embodiment, the first antenna 11 and the second antenna 12 have a common aperture. For example, refer to FIG. 2 or FIG. 3. FIG. 2 or FIG. 3 illustrates a three-dimensional stereoscopic view of a common aperture dual-polarized antenna system. Specifically, the first substrate 114 and the second substrate 124 are perpendicular to each other, the first substrate 114 is horizontally placed, and the second substrate 124 is vertically placed. For example, the first substrate 114 and the second substrate 124 are vertically stacked, and the first substrate 114 is above the second substrate 124. A first microstrip circuit is disposed on the first substrate 114, and a second microstrip circuit is disposed on the second substrate 124. The first microstrip circuit and the second microstrip circuit are perpendicular to each other, the first microstrip circuit is horizontally placed, and the second microstrip circuit is vertically placed. For example, the first microstrip circuit and the second microstrip circuit are vertically stacked, and the first microstrip circuit is above the second microstrip circuit. In one embodiment, the feedpoint 115 of the first antenna 11 and the feedpoint 125 of the second antenna 12 are located on a same vertical line, and the feedpoint 125 of the second antenna 12 is right below the feedpoint 115 of the first antenna 11.

An orientation relationship such as "above" and "below" herein is, for example, relative to a reference plane, and the reference plane is, for example, the ground 15 of the antenna system 10 or the ground plane. For example, if the ground 15 of the antenna system 10 is used as the reference plane, the first substrate 114 is parallel to the ground 15, and the second substrate 124 is perpendicular to the ground 15.

The first antenna 11 is connected to a decoupling resonator. The decoupling resonator is not shown in FIG. 2, FIG. 3, or FIG. 4, and the following specifically describes the decoupling resonator by using examples with reference to FIGS. 6(a)-(b), FIG. 9, FIG. 12, and FIG. 17.

The decoupling resonator is used to reduce coupling between the first antenna 11 and the second antenna 12. The decoupling resonator has a resonance frequency. The resonance frequency of the decoupling resonator is within an operating frequency band of the second antenna 12. In other words, the resonance frequency of the decoupling resonator is a frequency in the operating frequency band of the second antenna 12. The decoupling resonator can resonate in the operating frequency band of the second antenna 12.

The connection between the first antenna 11 and the decoupling resonator means that the first antenna 11 and the second antenna 12 are physically connected. The connection is, for example, electrical connection. In one embodiment, the decoupling resonator is connected to the feedpoint 115 of the first antenna 11. For example, refer to FIG. 2 or FIG. 3. When the decoupling resonator provided in the embodiments of this application is loaded in the common aperture dual-polarized antenna system shown in FIG. 2 or FIG. 3, the decoupling resonator is connected to the feedpoint 115 of the horizontal polarization antenna.

In one embodiment, the antenna system 10 further includes a plurality of reflectors. The plurality of reflectors are separately disposed on peripheries of the second antenna 12. The plurality of reflectors are configured to implement a sector switching function for the second antenna 12. For example, refer to FIG. 4. FIG. 4 shows an example of disposing the reflectors on the basis of the antenna system 10 shown in FIG. 2. As shown in FIG. 4, four reflectors are placed at the peripheries of the vertical polarization antenna shown in FIG. 2. The four reflectors are respectively a first reflector 131, a second reflector 132, a third reflector 133, and a fourth reflector 134. The first reflector 131 and the second reflector 132 are, for example, on a same plane. The first reflector 131 and the second reflector 132 are, for example, disposed on the second substrate 124. The third reflector 133 and the fourth reflector 134 are, for example, on a same plane. The third reflector 133 and the fourth reflector 134 are, for example, on a same plane. The plane on which the third reflector 133 and the fourth reflector 134 are located is perpendicular to the plane on which the first reflector 131 and the second reflector 132 are located. The vertical polarization antenna can form a four-sector switching smart antenna by using the first reflector 131, the second reflector 132, the third reflector 133, and the fourth reflector 134.

In one embodiment, the antenna system 10 further includes a radome 14. The radome 14 is disposed above the first antenna 11 and the second antenna 12. A material of the radome 14 is, for example, plastic. In one embodiment, the radome 14 is a double-layer structure. For example, refer to FIG. 4. FIG. 4 is an example of adding the double-layer radome 14 to the antenna system 10 shown in FIG. 2. The radome 14 shown in FIG. 4 includes a first layer 141 and a second layer 142. The radome 14 is used to protect the first antenna 11 and the second antenna 12, and can have an aesthetic effect.

In one embodiment, the ground 15 is below the antenna system 10. For example, one or more antenna systems 10 are placed on the ground 15. For example, refer to FIG. 4. FIG. 4 shows an example of placing the antenna system 10 shown in FIG. 2 or FIG. 3 on the ground 15.

In the antenna system 10, because the first antenna 11 and the second antenna 12 are vertically stacked, a spacing between the feedpoint 115 of the first antenna 11 and the feedpoint 125 of the second antenna 12 is relatively small. Therefore, when the first antenna 11 is not loaded with the decoupling resonator, isolation between the first antenna 11 and the second antenna 12 is very low. For example, in the dual-polarized antenna system shown in FIG. 2 or FIG. 3, when the horizontal polarization antenna is not loaded with the decoupling resonator, the horizontal polarization antenna and the vertical polarization antenna are strongly coupled, and isolation between the horizontal polarization antenna and the vertical polarization antenna is very low.

The decoupling resonator provided in the embodiments of this application may be used as an apparatus for improving antenna isolation (antenna isolation). The decoupling resonator is loaded on the first antenna 11, to implement a decoupling design. Specifically, because the decoupling resonator is connected to the first antenna 11, and the resonance frequency of the decoupling resonator is within the operating frequency band of the second antenna 12, the decoupling resonator can resonate in the operating frequency band of the second antenna 12. Therefore, for a current that is in the operating frequency band of the second antenna 12 and that is generated by the first antenna 11, the decoupling resonator is a short circuit, so that the current that is in the operating frequency band of the second antenna 12 and that is generated by the first antenna 11 is more likely to flow to the decoupling resonator rather than the second antenna 12. Because a current between the first antenna 11 and the second antenna 12 is interfered, the coupling between the first antenna 11 and the second antenna 12 is reduced, and the isolation between the first antenna 11 and the second antenna 12 is improved. In addition, In one embodiment, the decoupling resonator is not connected to the second antenna 12, so that a current generated by the second antenna 12 is not affected as much as possible, and operating of the second antenna 12 is not affected.

For example, when the antenna system 10 is the dual-polarized antenna system, the dual-polarized antenna system may be equivalent to a two-port network. For example, refer to FIGS. 5(a)-5(d). FIGS. 5(a)-5(d) illustrates the two-port network equivalent to the dual-polarized antenna system. In FIGS. 5(a)-5(d), the first antenna 11 has a first port, and the second antenna 12 has a second port.

Figures 5A, 5B, 5C, 5D:
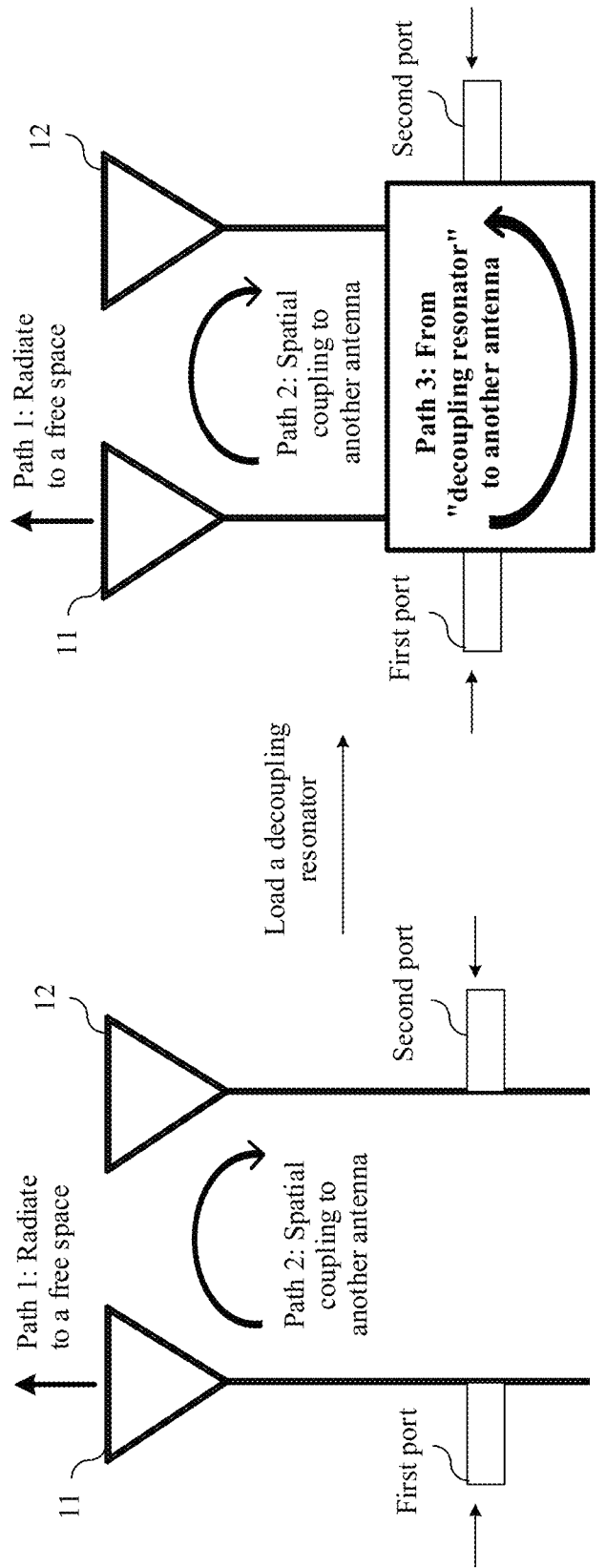
FIGS. 5(a)-5(d) are diagrams of a two-port network equivalent to an antenna system according to an embodiment of this application.

FIG. 5(a) illustrates energy propagation paths existing after an antenna 1 is excited before the decoupling resonator is added. After the antenna 1 is excited, the energy propagation paths include a path 1 and a path 2. The path 1 is a path radiated from the first antenna 11 to a free space. The path 2 is a path that the first antenna 11 is spatially coupled to an antenna 2.

FIG. 5(b) illustrates energy propagation paths existing after an antenna 1 is excited after the decoupling resonator is added. After the antenna 1 is excited, the energy propagation paths include a path 1, a path 2 and a path 3. In other words, the propagation paths of energy not only include the path 1 and the path 2, but also include the new path 3.

The path 3 is a new path generated by adding the decoupling resonator to the antenna system. The path 3 is a combination of a physical path and a spatial path. Specifically, the path 3 includes the first port→the decoupling resonator→the second port. The path from the first port to the decoupling resonator in the path 3 is the physical path, and the physical path is a transmission path on the substrate on which the microstrip circuit of the first antenna 11 is located. Specifically, because the first antenna 11 is connected to the decoupling resonator, an electromagnetic wave can be transmitted from the first port to the decoupling resonator through the substrate of the first antenna 11. The path from the decoupling resonator to the second port in the path 3 is the spatial path, and the spatial path is a transmission path in air. Specifically, the electromagnetic wave is transmitted from the decoupling resonator to the second port through the air.

With reference to FIG. 5(a) and FIG. 5(b), refer to FIG. 5(c) and FIG. 5(d). FIG. 5(c) corresponds to FIG. 5(a). A current A (namely, a current represented by a solid line) shown in FIG. 5(c) illustrates a current transmitted through the path 2 when the decoupling resonator is not loaded.

FIG. 5(d) corresponds to FIG. 5(b). A current A (namely, a current represented by a solid line) shown in FIG. 5(d) illustrates a current transmitted through the path 2 when the decoupling resonator is loaded. A current B (namely, a current represented by a dashed line) shown in FIG. 5(d) illustrates a current transmitted through the path 3 when the decoupling resonator is loaded.

Referring to FIG. 5(d), because the current A and the current B have a phase difference, the current A and the current B cancel each other out, and an original function of the current A is weakened. That is, a sum of the current A and the current B in FIG. 5(d) is weaker than the current A in FIG. 5(c). This technical principle of mutual weakening of currents may be understood by using a vector and an algorithm in plane geometry. Specifically, the current A is equivalent to a vector, and the current B is equivalent to another vector. Because there is a phase difference between the two vectors corresponding to the current A and the current B, a vector sum of the two vectors is less than each vector of the two vectors. When the two vectors are equal in size and opposite in direction, the vector sum is zero after the two vectors are added.

Because a sum of currents of the path 2 and the path 3 in FIG. 5(b) is smaller than the current of the path 2 in FIG. 5(a), a sum of currents of the path 1, the path 2, and the path 3 in FIG. 5(b) is smaller than a sum of currents of the path 1 and the path 2 in FIG. 5(a). Therefore, coupling energy between the first antenna 11 and the second antenna 12 in the antenna system shown in FIG. 5(b) is less than coupling energy between the first antenna 11 and the second antenna 12 in the antenna system shown in FIG. 5(a). In other words, compared with the antenna system (namely, the antenna system having the path 1 and the path 2) shown in FIG. 5(a), the coupling energy between the first antenna 11 and the second antenna 12 in the antenna system (namely, the antenna system having the path 1, the path 2, and the path 3) shown in FIG. 5(b) is weakened.

In conclusion, because the decoupling resonator is added, coupling energy between the first antenna 11 and the second antenna 12 can be weakened, so that isolation between the first port and the second port is improved, that is, the isolation between the first antenna 11 and the second antenna 12 is improved.

For example, in the common aperture dual-polarized antenna system shown in FIG. 2 to FIG. 4, the decoupling resonator is loaded on the horizontal polarization antenna, so that a circuit for suppressing mutual coupling between the horizontal polarization antenna and the vertical polarization antenna is added. Therefore, a technical problem that isolation is insufficient when the horizontal polarization antenna and the vertical polarization antenna work in different frequency bands or in a same frequency band is resolved, and the isolation between the horizontal polarization antenna and the vertical polarization antenna is effectively improved. In addition, the vertical polarization antenna is not affected.

The foregoing describes an entire antenna system 10 provided in the embodiments of this application. How to implement the decoupling resonator in the antenna system 10 includes a plurality of implementations. The following uses examples to describe four embodiments of the decoupling resonator in the antenna system 10 by using decoupling resonator 111, decoupling resonator 111b, decoupling resonator 111c, and decoupling resonator 114. In one embodiment, the decoupling resonator in the antenna system 10 is any one of the decoupling resonator 111, the decoupling resonator 111b, the decoupling resonator 111c, or the decoupling resonator 114. In one embodiment, the decoupling resonator in the antenna system 10 is a combination of a plurality of decoupling resonators 111, 111b, 111c, 114.

It should be understood that the decoupling resonator 111, the decoupling resonator 111b, the decoupling resonator 111c, or the decoupling resonator 114 described below may be disposed in the antenna system 10 shown in FIG. 2, or may be disposed in the antenna system 10 shown in FIG. 3, or may be disposed in the antenna system 10 shown in FIG. 4. This is not limited in this embodiment.

It should be further understood that, for a feature of the decoupling resonator 111, the decoupling resonator 111b, the decoupling resonator 111c, and the decoupling resonator 114 that is described below and that is similar to that described above, refer to the foregoing description of the decoupling resonator in the antenna system 10, and details are not described in the decoupling resonators 111, 111b, 111c, 114.

In some embodiments, the decoupling resonator 111 is implemented by using a stepped impedance resonator (SIR). Specifically, the decoupling resonator 111 is the stepped impedance resonator. The stepped impedance resonator is connected to the feedpoint 115 of the first antenna 11. In other words, the stepped impedance resonator is loaded at the feedpoint 115 of the first antenna 11. The stepped impedance resonator is disposed between the first antenna 11 and the coplanar stripline connected to the first antenna 11.

When the first antenna 11 is the dipole antenna 112, the stepped impedance resonator is connected to a feedpoint of the dipole antenna 112. When the first antenna 11 is the loop antenna 113, the stepped impedance resonator is connected to a feedpoint of the loop antenna 113. When the first antenna 11 includes the dipole antenna 112 and the loop antenna 113, the stepped impedance resonator is connected to a common feedpoint of the dipole antenna 112 and the loop antenna 113. A form of the stepped impedance resonator is, for example, a metal patch.

Figure 6A:
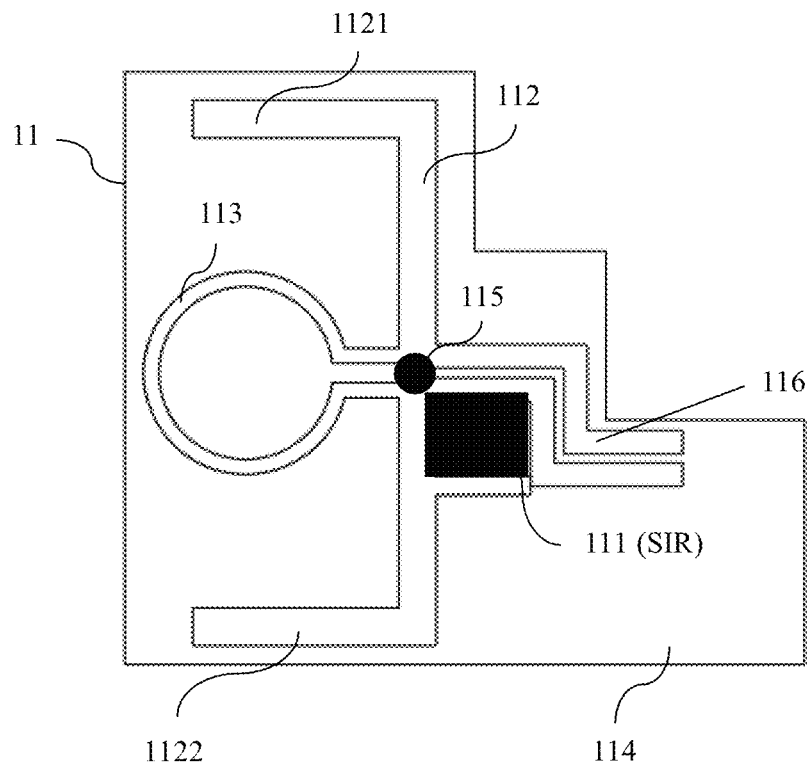
FIGS. 6(a)-6(b) are diagrams of a decoupling resonator implemented by using a stepped impedance resonator according to an embodiment of this application.

For example, refer to FIG. 6(a). FIG. 6(a) shows an example of adding a stepped impedance resonator to the horizontal polarization antenna shown in FIG. 2, FIG. 3, or FIG. 4. As shown in FIG. 6(a), the horizontal polarization antenna is a combination of the dipole antenna 112 and the loop antenna 113. Both the dipole antenna 112 and the loop antenna 113 are connected to a coplanar stripline with an open-circuited or short-circuited end at the feedpoint 115 of the first antenna 11. The stepped impedance resonator is connected to the feedpoint 115 of the first antenna 11.

In one embodiment, the first antenna 11 includes at least one of the dipole antenna 112 or the loop antenna 113, the first antenna 11 includes an arm, and a longitudinal width of the stepped impedance resonator is greater than a width of the arm of the first antenna 11. Because the longitudinal width of the stepped impedance resonator is wider than that of the arm of the first antenna 11, the stepped impedance resonator has a low impedance characteristic compared with the arm of the first antenna 11, that is, the impedance of the stepped impedance resonator is less than the impedance of the arm of the first antenna 11. When the first antenna 11 is the dipole antenna 112, the longitudinal width of the stepped impedance resonator is greater than widths of two arms of the dipole antenna 112. Referring to FIG. 6(a), the longitudinal width of the stepped impedance resonator is greater than the width of the first arm 1121 and the width of the second arm 1122. When the first antenna 11 is the loop antenna 113, the longitudinal width of the stepped impedance resonator is greater than the width of an arm of the loop antenna 113. The width of the arm of the loop antenna 113 herein is, for example, a difference between an outer diameter and an inner diameter of the loop antenna 113. When the first antenna 11 is a combination of the dipole antenna 112 and the loop antenna 113, the longitudinal width of the stepped impedance resonator is greater than the width of the arm of the dipole antenna 112 or the loop antenna 113.

The longitudinal width refers to a width whose direction is perpendicular to a cabling direction of the coplanar stripline 116.

Figure 6B:
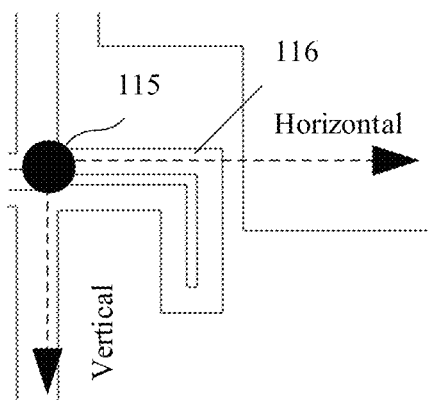

The cabling direction of the coplanar stripline 116 is a direction in which the coplanar stripline 116 extends outwards from the feedpoint. In other words, longitudinal and transverse in terms "longitudinal width" and "transverse length" are defined based on a direction of the coplanar stripline 116 at the feedpoint. For example, refer to FIG. 6(b). FIG. 6(b) is a locally enlarged diagram of the coplanar stripline 116. Vertical in FIG. 6(b) is an example of the longitudinal in the term "longitudinal width". Horizontal in FIG. 6(b) is an example of the transverse in the term "transverse length". The stepped impedance resonator is not shown in FIG. 6(b).

It should be understood that the coplanar stripline 116 shown in FIGS. 6(a)-6(b), FIG. 9, FIG. 12, and FIG. 17 illustrates the coplanar stripline 116 having a bent shape. A shape of the coplanar stripline 116 is designed as the bent shape, so that space occupied by the coplanar stripline 116 can be saved. The bent shape is an optional manner of a shape of the coplanar stripline 116. In some other embodiments, a shape of the coplanar stripline 116 in the antenna system 10 is not the bent shape. For example, the shape of the coplanar stripline 116 is two straight lines parallel to each other.

In one embodiment, a transverse length of the stepped impedance resonator is 0.1 to 0.4 times an operating wavelength of the first antenna 11 or the second antenna 12. For example, the transverse length of the stepped impedance resonator is 0.15 to 0.35 times the operating wavelength of the first antenna 11 or the second antenna 12. For example, the transverse length of the stepped impedance resonator is 0.2 to 0.3 times the operating wavelength of the first antenna 11 or the second antenna 12. For example, the transverse length of the stepped impedance resonator is 0.25 times the operating wavelength of the first antenna 11 or the second antenna 12. The operating wavelength of the first antenna 11 herein is, for example, an operating wavelength in a medium of the first antenna 11. The operating wavelength of the second antenna 12 is, for example, an operating wavelength in a medium of the second antenna 12. For an algorithm of the operating wavelength in the medium, refer to formula (1). The transverse length refers to a length whose direction is parallel to the cabling direction of the coplanar stripline 116. The transverse length of the stepped impedance resonator is, for example, a length of a central stub of the stepped impedance resonator.

In one embodiment, the transverse length of the stepped impedance resonator is determined based on 0.25 times the operating wavelength of the first antenna 11 or the second antenna 12. For example, the transverse length of the stepped impedance resonator is obtained through adjustment on the basis of 0.25 times the operating wavelength of the first antenna 11 or the second antenna 12. In one embodiment, a process of determining the transverse length of the stepped impedance resonator includes: performing fine adjustment based on a requirement by using 0.25 times the operating wavelength of the first antenna 11 or the second antenna 12 as a center, and using a value obtained after the adjustment as the transverse length of the stepped impedance resonator. For example, 0.25 times the operating wavelength of the first antenna 11 or the second antenna 12 is used as the center, the operating wavelength is adjusted leftward or rightward by 0.15 times. A minimum value obtained after the adjustment to the left is as follows: 0.25 times the operating wavelength −0.15 times the operating wavelength=0.1 times the operating wavelength. A minimum value obtained after the adjustment to the right is as follows: 0.25 times the operating wavelength+0.15 times the operating wavelength=0.4 times the operating wavelength. Therefore, the transverse length of the stepped impedance resonator is 0.1 to 0.4 times the operating wavelength.

When the transverse length and the longitudinal width of the stepped impedance resonator fall within the value ranges described above, a decoupling effect can be improved. Specifically, for the first antenna 11, because the stepped impedance resonator is connected to the feedpoint 115 of the first antenna 11, the stepped impedance resonator is equivalent to a capacitance to ground of the first antenna 11. When the transverse length of the stepped impedance resonator is approximately 0.25 times the operating wavelength of the first antenna 11, a capacitance value of the capacitance to ground equivalent to the stepped impedance resonator is set to a maximum value, so that an equivalent circuit of the stepped impedance resonator has a large-capacitance grounding effect, thereby enhancing a resonance mode between the first antenna 11 and the second antenna 12, in other words, improving the isolation between the first antenna 11 and the second antenna 12, and implementing more effective decoupling.

In one embodiment, the decoupling resonator 111 implemented by using the stepped impedance resonator is applicable to a scenario in which the first antenna 11 and the second antenna 12 have different operating frequency bands. The decoupling resonator 111 can be used to implement an inter-frequency decoupling effect, so that the isolation between the first antenna 11 and the second antenna 12 is improved when the first antenna 11 and the second antenna 12 work in different frequency bands.

Figure 7:
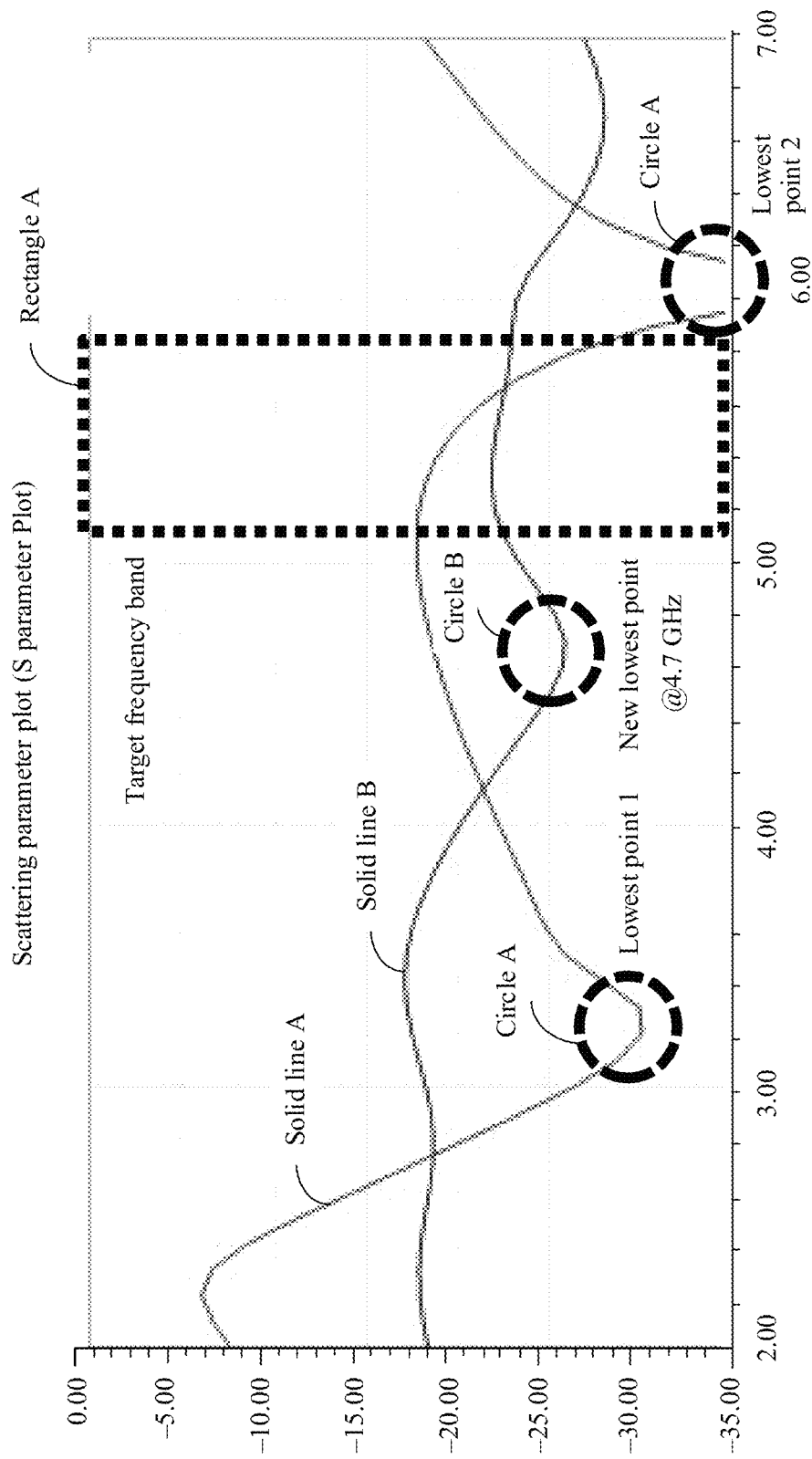
FIG. 7 is a diagram of a simulation result of an effect of loading a stepped impedance resonator on isolation according to an embodiment of this application.
Figure 8:
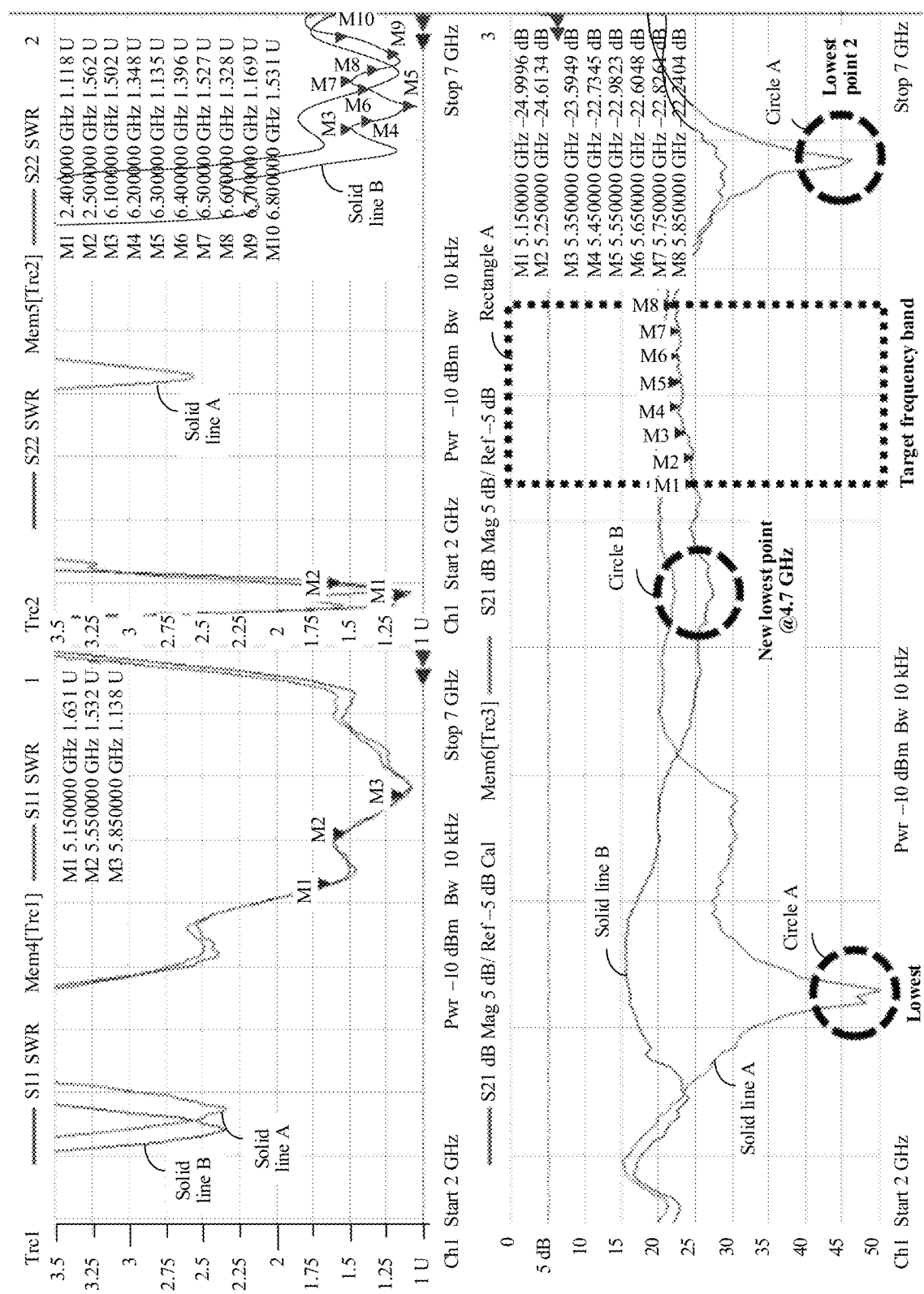
FIG. 8 is a diagram of a test result of an effect of loading a stepped impedance resonator on isolation according to an embodiment of this application.

For example, refer to FIG. 7 and FIG. 8. FIG. 7 is a diagram of a simulation result of an effect of loading a stepped impedance resonator on isolation, and FIG. 8 is a diagram of a test result of an effect of loading a stepped impedance resonator on isolation. FIG. 7 and FIG. 8 are described by using an example in which the first antenna 11 and the second antenna 12 work in different frequency bands. In FIG. 7 and FIG. 8, an example in which a target frequency band is 5.15 GHz to 5.85 GHz is used for description.

The target frequency band is a frequency band whose isolation is to be improved. In one embodiment, the target frequency band is an operating frequency band of the second antenna 12. For example, when the antenna system 10 includes a horizontal polarization antenna and a vertical polarization antenna, the target frequency band is an operating frequency band of the vertical polarization antenna.

As shown in FIG. 7, a solid line A represents a simulation result of original isolation. It can be seen that there are two lowest isolation points in a frequency range of 2 GHz to 7 GHz. The lowest isolation point of the original isolation is a minimum value point appearing on the solid line A, namely, a valley point of the solid line A. For example, the original isolation has two lowest isolation points, and the two lowest isolation points are respectively corresponding to a lowest point 1 and a lowest point 2 circled by two circles A in FIG. 7. It can be seen that when the frequency near the two lowest points, isolation between the two antennas are relatively high. The original isolation refers to isolation when the stepped impedance resonator is not loaded. However, when the solid line A is in WLAN operating frequency band 5.15 GHz to 5.85 GHz (the target frequency band for isolation improvement) corresponding to rectangle A, the isolation between two antennas is relatively poor. Especially, isolation at lowest frequency 5.15 GHz is only about 17 decibel (dB). A solid line B represents a simulation result of isolation S21 between the antennas after the stepped impedance resonator is loaded. After the stepped impedance resonator is loaded, a lowest isolation point is a minimum value point on the solid line B, namely, a valley point of the solid line B. After the stepped impedance resonator is loaded, the lowest isolation point corresponds, for example, to a new lowest point in circle B in FIG. 7. It can be seen from FIG. 7 that a new lowest isolation point is generated at 4.7 GHz circled by the circle B on the solid line B, and further, isolation between the antennas in the target frequency band is improved by about 4 dB. S21 represents isolation, and is a quantized data presentation form.

As shown in FIG. 8, a solid line A represents an original isolation (namely, isolation when no stepped impedance resonator is loaded) test result. It can be seen that in a frequency range of 2 GHz to 7 GHz, there are two main lowest isolation points, that is, lowest point 1 and lowest point 2 circled by two circles A. It can be seen that frequencies near the two lowest points are relatively high, and isolation between antennas is relatively high. However, when the solid line A is in WLAN operating frequency band 5.15 GHz to 5.85 GHz (the target frequency band for isolation improvement) corresponding to rectangle A, the isolation between antennas is relatively poor. Especially, the isolation at lowest frequency 5.15 GHz is only about 19 dB. A solid line B represents a test result of isolation S21 between the antennas after the stepped impedance resonator is loaded. A new lowest isolation point is generated at 4.7 GHz circled by a circle B on the solid line B, and further, isolation between the antennas in the target frequency band is improved by about 3.5 dB. In addition, a standing wave ratio (SWR) of the two antennas is still within 2.0. Radiation performance is basically not affected.

M in FIG. 8 represents a marker. There are many markers on the solid line A and the solid line B. For example, the upper part of the figure in FIG. 8 includes markers M1 (5.150000 GHz, 1.631 U), M2 (5.550000 GHz, 1.532 U), M3 (5.850000 GHz, 1.138 U), M1 (2.40000 GHz, 1.118 U), M2 (2.50000 GHz, 1.562 U), M3 (6.10000 GHz, 1.502 U), M4 (6.20000 GHz, 1.348 U), M5 (6.30000 GHz, 1.135 U), M6 (6.40000 GHz, 1.396 U), M7 (6.50000 GHz, 1.527 U), M8 (6.60000 GHz, 1.328 U), M9 (6.70000 GHz, 1.169 U), and M10 (6.80000 GHz, 1.531 U). The lower part of the figure in FIG. 8 includes markers M1 (5.150000 GHz, −24.9996 dB), M2 (5.250000 GHz, −24.6134 dB), M3 (5.350000 GHz, −23.5949 dB), M4 (5.450000 GHz, −22.7345 dB), M5 (5.550000 GHz, −22.9823 dB), M6 (5.650000 GHz, −22.6048 dB), M7 (5.750000 GHz, −22.8261 dB), and M8 (5.850000 GHz, −22.2404 dB). U represents standing wave. It can be seen from FIG. 8 that, when the decoupling resonator 111 is added, the standing wave of the antenna remains good, and the antenna can still work normally.

The foregoing describes possible embodiments of the decoupling resonator by using the decoupling resonator 111 as an example. The following describes possible embodiments of the decoupling resonator by using the decoupling resonator 111*b* as an example.

In one embodiment, the decoupling resonator 111*b* is implemented by using a ring resonator (RR). Specifically, the decoupling resonator 111*b* is the ring resonator, and the ring resonator is connected to the feedpoint 115 of the first antenna 11. In other words, the ring resonator is loaded at the feedpoint 115 of the first antenna 11. The ring resonator is disposed between the first antenna 11 and the coplanar stripline connected to the first antenna 11. When the first antenna 11 is the dipole antenna 112, the ring resonator is connected to a feedpoint of the dipole antenna 112. When the first antenna 11 is the loop antenna 113, the ring resonator is connected to a feedpoint of the loop antenna 113. When the first antenna 11 includes the dipole antenna 112 and the loop antenna 113, the ring resonator is connected to a common feedpoint of the dipole antenna 112 and the loop antenna 113. A form of the ring resonator is, for example, a metal patch.

Figure 9:
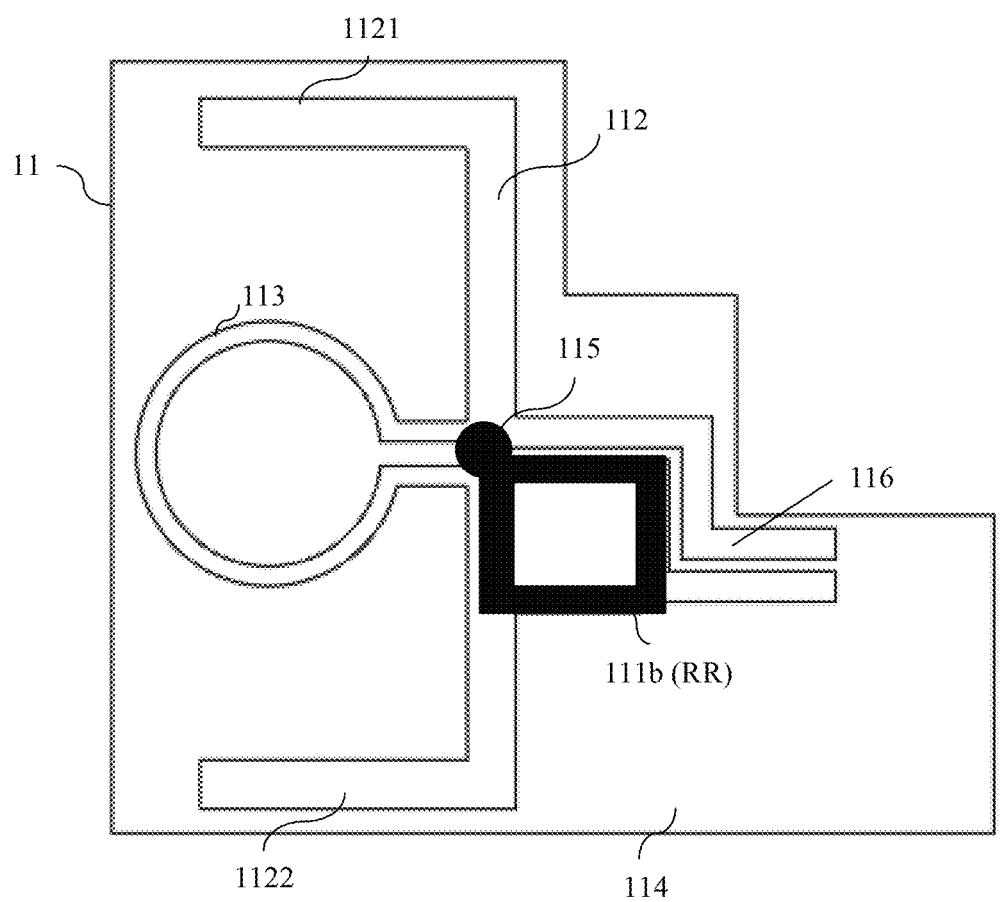
FIG. 9 is a diagram of a decoupling resonator implemented by using a ring resonator according to an embodiment of this application.

For example, refer to FIG. 9. FIG. 9 shows an example of adding a ring resonator to the horizontal polarization antenna shown in FIG. 2, FIG. 3, or FIG. 4. As shown in FIG. 9, the horizontal polarization antenna is a combination of the dipole antenna 112 and the loop antenna 113. Both the dipole antenna 112 and the loop antenna 113 are connected to a coplanar stripline with an open-circuited or short-circuited end at the feedpoint 115 of the first antenna 11. The ring resonator is connected to the feedpoint 115 of the first antenna 11.

In one embodiment, a circumference of the ring resonator is 0.8 to 1.2 times an operating wavelength of the first antenna 11 or the second antenna 12. For example, the circumference of the ring resonator is 0.9 to 1.1 times the operating wavelength of the first antenna 11 or the second antenna 12. For example, the circumference of the ring resonator is 1 times the operating wavelength of the first antenna 11 or the second antenna 12. In other words, the circumference of the ring resonator is the same as the operating wavelength of the first antenna 11 or the second antenna 12. The operating wavelength of the first antenna 11 herein is, for example, an operating wavelength in a medium of the first antenna 11. The operating wavelength of the second antenna 12 is, for example, an operating wavelength in a medium of the second antenna 12. For an algorithm of the operating wavelength in the medium, refer to formula (1). The circumference of the ring resonator is determined based on a radius (for example, at least one of an outer diameter or an inner diameter) of the ring resonator.

In one embodiment, the circumference of the ring resonator is determined based on 1 times the operating wavelength of the first antenna 11 or the second antenna 12. The circumference of the ring resonator is obtained through adjustment on the basis of 1 times the operating wavelength of the first antenna 11 or the second antenna 12. In one embodiment, a process of determining the circumference of the ring resonator includes: performing fine adjustment based on a requirement by using 1 times the operating wavelength of the first antenna 11 or the second antenna 12 as a center, and using a value obtained after the adjustment as the circumference of the ring resonator. For example, 1 times the operating wavelength of the first antenna 11 or the second antenna 12 is used as the center, the operating wavelength is adjusted leftward or rightward by 0.2 times. A minimum value obtained after the adjustment to the left is as follows: 1 times the operating wavelength −0.2 times the operating wavelength=0.8 times the operating wavelength. A minimum value obtained after the adjustment to the right is as follows: 1 times the operating wavelength+0.2 times the operating wavelength=1.2 times the operating wavelength. Therefore, the circumference of the ring resonator is 0.8 to 1.2 times the operating wavelength.

When the circumference of the ring resonator falls within the value ranges described above, a decoupling effect can be improved. Specifically, for the first antenna 11, because the ring resonator is connected to the feedpoint 115 of the first antenna 11, when a transverse length of the ring resonator is approximately 1 times the operating wavelength of the first antenna 11, the ring resonator can resonate at a corresponding frequency, to create a current loop, so that a new resonance mode is generated between the first antenna 11 and the second antenna 12, in other words, the isolation between the first antenna 11 and the second antenna 12 is improved, so that more effective decoupling is implemented. The corresponding frequency is a frequency in a target frequency band, and the corresponding frequency is, for example, a frequency in the operating frequency band of the vertical polarization antenna (the second antenna 12).

In one embodiment, the decoupling resonator 111b implemented by using the ring resonator is applicable to a scenario in which the first antenna 11 and the second antenna 12 have different operating frequency bands. The decoupling resonator 111b can be used to implement an inter-frequency decoupling effect, so that the isolation between the first antenna 11 and the second antenna 12 is improved when the first antenna 11 and the second antenna 12 work in different frequency bands.

Figure 10:
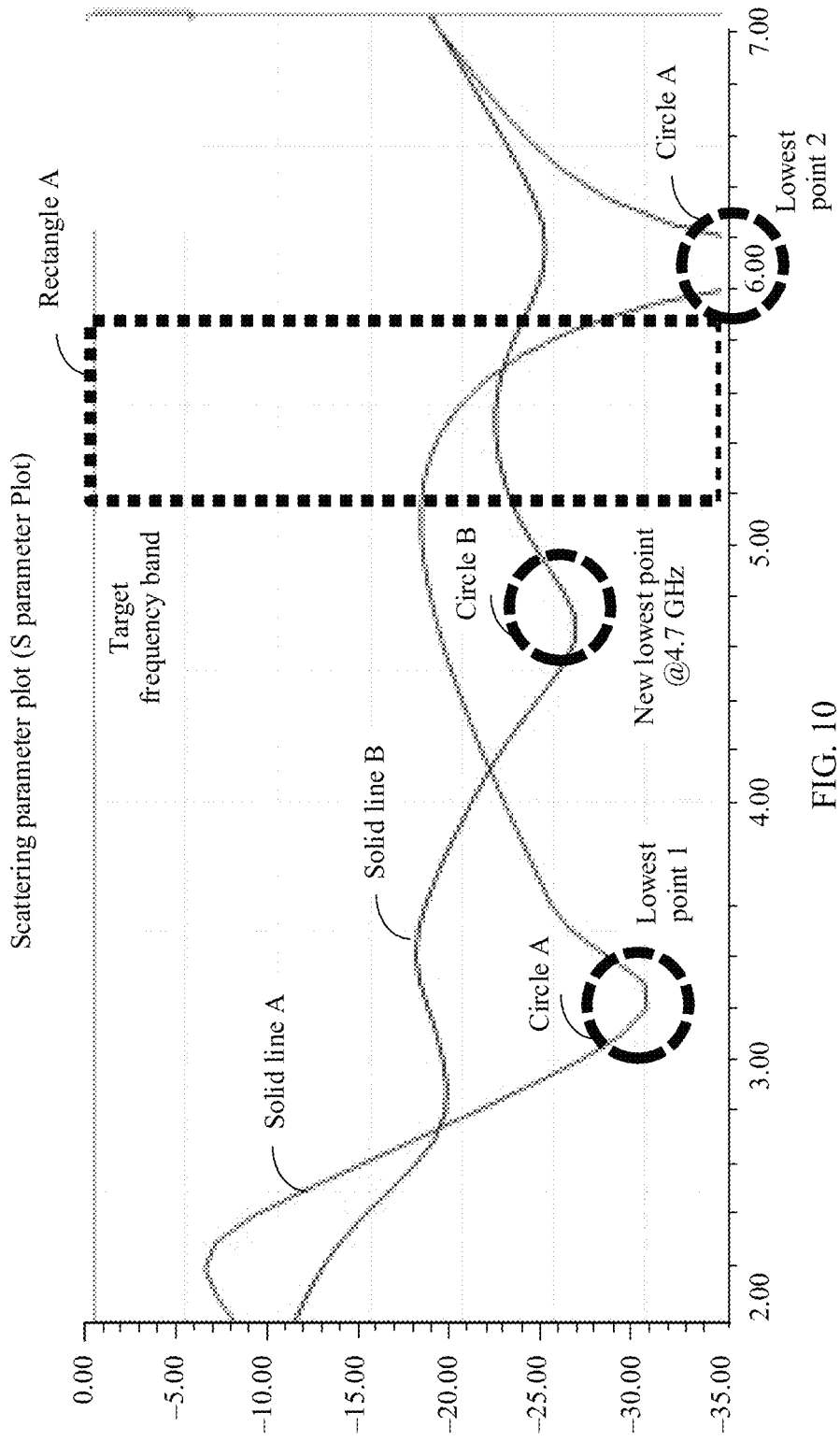
FIG. 10 is a diagram of a simulation result of an effect of loading a ring resonator on isolation according to an embodiment of this application.
Figure 11:
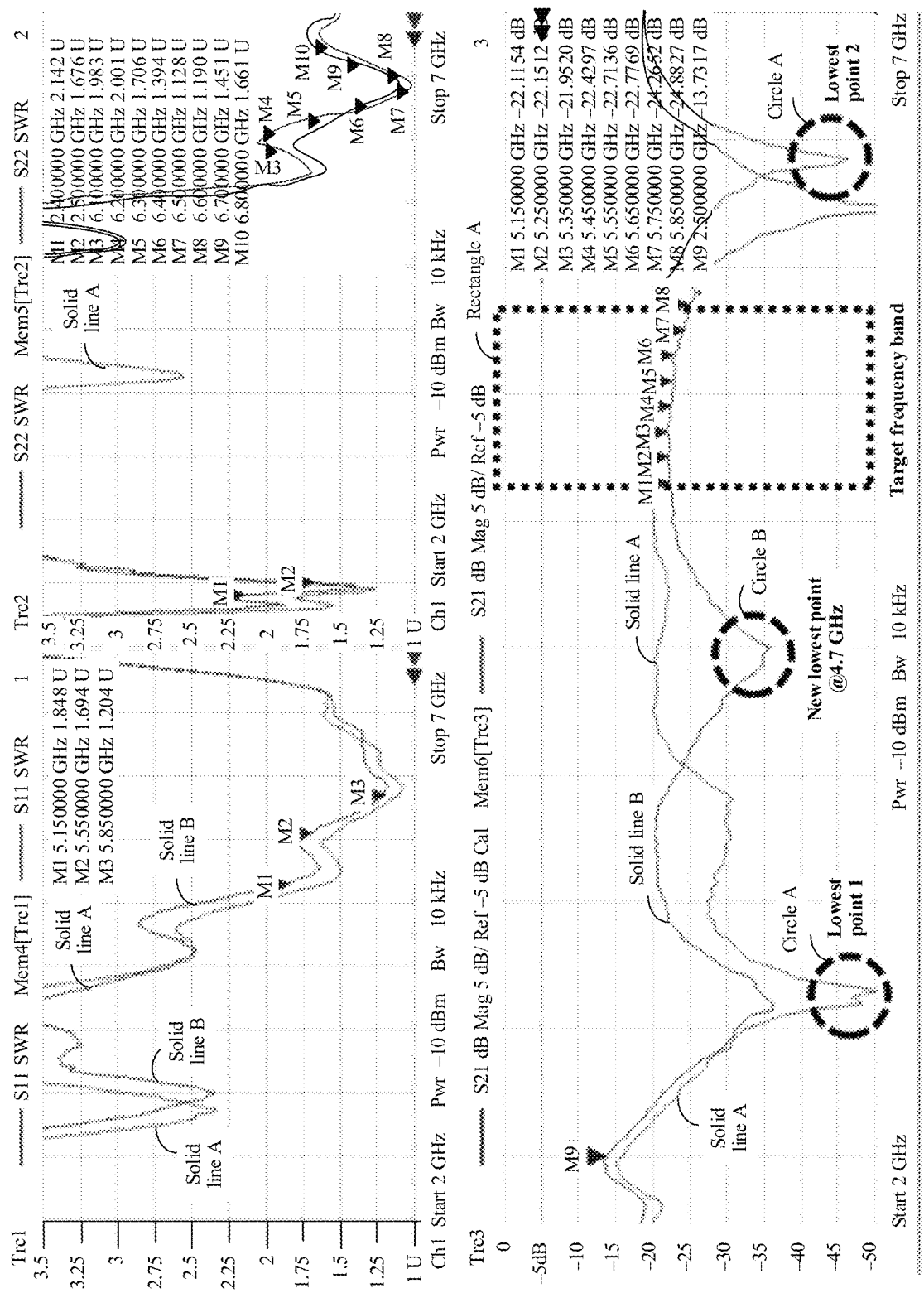
FIG. 11 is a diagram of a test result of an effect of loading a ring resonator on isolation according to an embodiment of this application.

For example, refer to FIG. 10 and FIG. 11. FIG. 10 and FIG. 11 are diagrams of simulation results of impact of loading a ring resonator on isolation. FIG. 10 and FIG. 11 are described by using an example in which the first antenna 11 and the second antenna 12 work in different frequency bands. In FIG. 10 and FIG. 11, an example in which a target frequency band is 5.15 GHz to 5.85 GHz is used for description.

As shown in FIG. 10, a solid line A represents an original isolation (namely, isolation when no ring resonator is loaded) simulation result. It can be seen that in a frequency range of 2 GHz to 7 GHz, there are two lowest isolation points, that is, lowest point 1 and lowest point 2 circled by two circles A. It can be seen that frequencies near the two lowest points are relatively high, and isolation between antennas is relatively high. The original isolation refers to isolation when the ring resonator is not loaded. However, when the solid line A is in WLAN operating frequency band 5.15 GHz to 5.85 GHz (the target frequency band for isolation improvement) corresponding to rectangle A, the isolation between two antennas is relatively poor. Especially, the isolation at lowest frequency 5.15 GHz is only about 17 dB. A solid line B represents a simulation result of isolation S21 between the antennas after the ring resonator is loaded. A new lowest isolation point is generated at frequencies near 4.7 GHz circled by a circle B on the solid line B, and further, isolation between the antennas in the target frequency band is improved by about 4 dB.

As shown in FIG. 11, a solid line A represents an original isolation (namely, isolation when no ring resonator is loaded) test result. It can be seen that in a frequency range of 2 GHz to 7 GHz, there are two main lowest isolation points, that is, lowest point 1 and lowest point 2 circled by two circles A. It can be seen that frequencies near the two lowest points are relatively high, and isolation between antennas is relatively high. However, when the solid line A is in WLAN operating frequency band 5.15 GHz to 5.85 GHz (the target frequency band for isolation improvement) corresponding to rectangle A, the isolation between antennas is relatively poor. Especially, the isolation at lowest frequency 5.15 GHz is only about 19 dB. A solid line B represents a test result of isolation S21 between the antennas after the ring resonator is loaded. A new lowest isolation point is generated at 4.7 GHz circled by a circle B on the solid line B, and further, isolation between the antennas in the target frequency band is improved by about 3.5 dB. In addition, a standing wave ratio of the two antennas is still within 2.0. Radiation performance is basically not affected.

M in FIG. 11 represents a marker, and the upper part of the figure in FIG. 11 includes markers M1 (5.15 0000 GHz, 1.848 U), M2 (5.55 0000 GHz, 1.694 U), M3 (5.85 0000 GHz, 1.204 U), M1 (2.40000 GHz, 2.142 U), M2 (2.50000 GHz, 1.676 U), M3 (6.10000 GHz, 1.983 U), M4 (6.20000 GHz, 2.001 U), M5 (6.30000 GHz, 1.706 U), M6 (6.40000 GHz, 1.394 U), M7 (6.50000 GHz, 1.128 U), M8 (6.60000 GHz, 1.190 U), M9 (6.70000 GHz, 1.451 U), and M10

(6.80000 GHz, 1.661 U). The lower part of the figure in FIG. 11 includes markers M1 (5.150000 GHz, −22.1154 dB), M2 (5.250000 GHz, −22.1512 dB), M3 (5.350000 GHz, −21.9520 dB), M4 (5.450000 GHz, −22.4297 dB), M5 (5.550000 GHz, −22.7136 dB), M6 (5.650000 GHz, −22.7769 dB), M7 (5.750000 GHz, −24.2652 dB), M8 (5.850000 GHz, −24.8827 dB) and M9 (2.500000 GHz, −13.7317 dB).

The foregoing describes possible embodiments of the decoupling resonator by using the decoupling resonator 111b as an example. The following describes another possible embodiments of the decoupling resonator by using the decoupling resonator 111c as an example.

In some embodiments, the decoupling resonator 111c is implemented by using a transmission line and an open-circuit stub. Specifically, the decoupling resonator 111c includes the transmission line and one open-circuit stub.

The transmission line is connected to the feedpoint 115 of the first antenna 11. In one embodiment, the transmission line is a coplanar stripline 1131 or a slotline.

The open-circuit stub is connected to an end of the transmission line. In other words, the end of the transmission line is loaded with the open-circuit stub. The open-circuit stub is located at an end of the coplanar stripline 1131. From the point of view of a circuit, the open-circuit stub and the transmission line are connected in series. The open-circuit stub may also be referred to as an open ended stub.

In one embodiment, the decoupling resonator 111c is a stub loaded coplanar stripline (SLCPS) resonator. The SLCPS resonator includes the coplanar stripline 1131 and the open-circuit stub. The coplanar stripline 1131 in the SLCPS resonator is connected to the feedpoint 115 of the first antenna 11. From the point of view of the circuit, the open-circuit stub and the coplanar stripline 1131 are connected in series. In one embodiment, a short circuit is first formed on the end of the coplanar stripline 1131, and then the end of the coplanar stripline 1131 in a short-circuit state is connected to the open-circuit stub, to form the SLCPS resonator. A form of the SLCPS resonator is, for example, a metal patch.

When the first antenna 11 is the dipole antenna 112, a structure of the SLCPS resonator is, for example, that a feedpoint of the dipole antenna 112 is connected to the coplanar stripline 1131, and the end of the coplanar stripline 1131 is connected to one open-circuit stub.

When the first antenna 11 is the loop antenna 113, a structure of the SLCPS resonator is, for example, that a feedpoint of the loop antenna 113 is connected to the coplanar stripline 1131, and the end of the coplanar stripline 1131 is connected to one open-circuit stub.

When the first antenna 11 is a combination of the dipole antenna 112 and the loop antenna 113, a structure of the SLCPS resonator is, for example, that a common feedpoint of the dipole antenna 112 and the loop antenna 113 is connected to the coplanar stripline 1131, and the end of the coplanar stripline 1131 is connected to the open-circuit stub.

Figure 12:
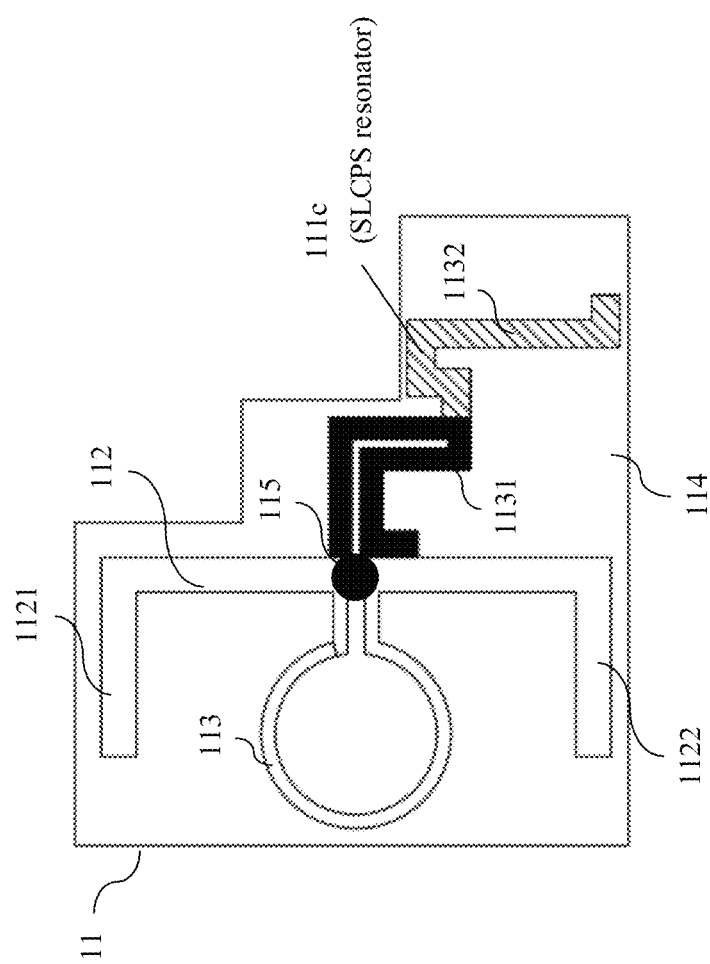
FIG. 12 is a diagram of a decoupling resonator implemented by using an SLCPS resonator according to an embodiment of this application.

For example, refer to FIG. 12. FIG. 12 shows an example of adding an SLCPS resonator to the horizontal polarization antenna shown in FIG. 2, FIG. 3, or FIG. 4. As shown in FIG. 12, the horizontal polarization antenna is a combination of the dipole antenna 112 and the loop antenna 113. Both the dipole antenna 112 and the loop antenna 113 are connected to the coplanar stripline 1131 at the feedpoint 115 of the first antenna 11. The coplanar stripline 1131 is directly connected to one open-circuit stub 1132.

Figure 13:
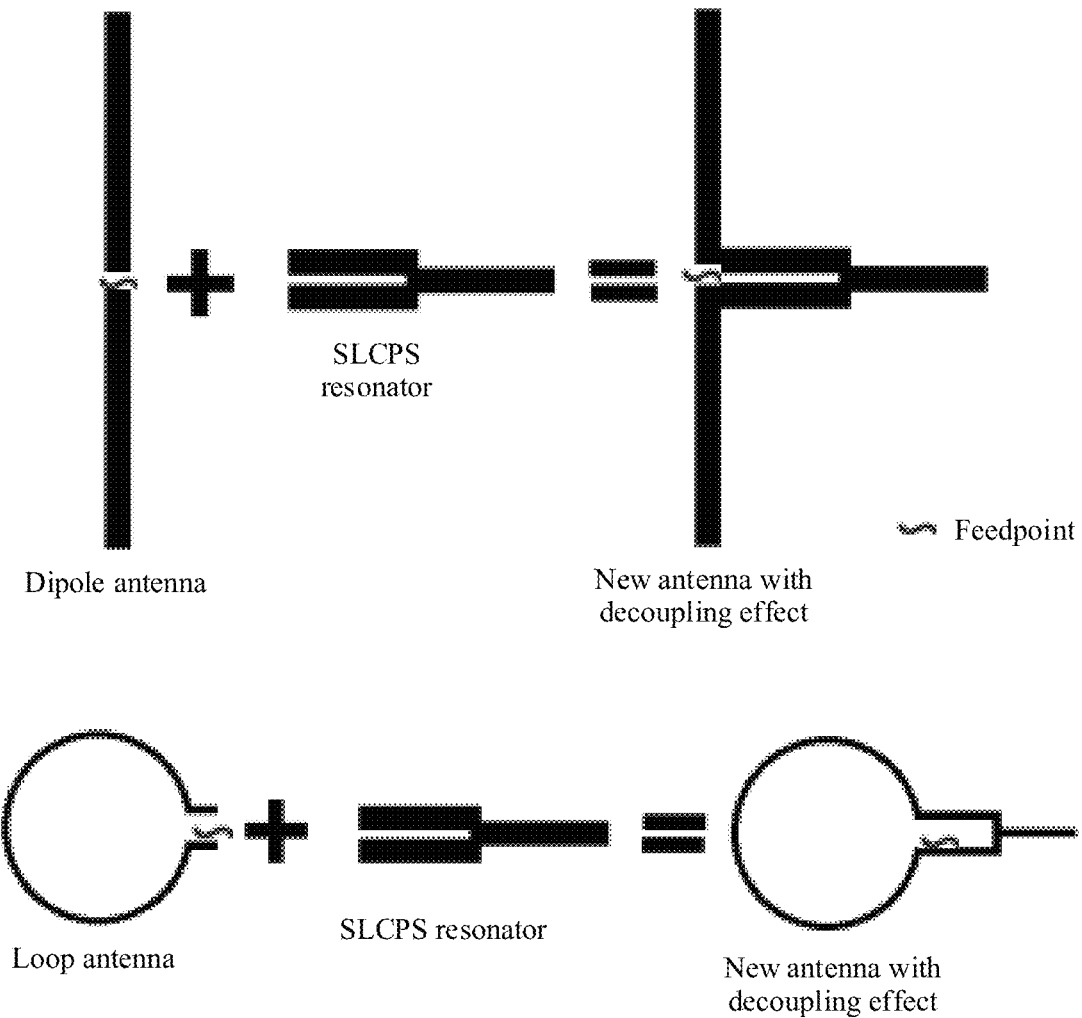
FIG. 13 is a diagram of a dipole antenna or a loop antenna loading an SLCPS resonator according to an embodiment of this application.

For example, refer to FIG. 13. FIG. 13 shows an example of comparing an evolution process before and after an SLCPS resonator is loaded on the dipole antenna 112 or the loop antenna 113. The dipole antenna 112 and the loop antenna 113 shown in FIG. 13 are examples for describing the first antenna 11 (for example, a horizontal polarization antenna). A position corresponding to an inverted S symbol in FIG. 13 represents a feedpoint of the dipole antenna 112 or the loop antenna 113. FIG. 13 are described by using an example in which the feedpoint 115 of the first antenna 11 is located at a central position of the first antenna 11.

As shown in FIG. 13, a central position of the dipole antenna 112 is connected to the coplanar stripline 1131, and an end of the coplanar stripline 1131 is connected to the open-circuit stub 1132. The central position of the dipole antenna 112 is also the feedpoint of the dipole antenna 112. By using this structure, the coplanar stripline 1131 and the open-circuit stub 1132 form the SLCPS resonator. The SLCPS resonator and the dipole antenna 112 are combined at a feedpoint position, so that the dipole antenna 112 is modified to a new antenna with a decoupling effect.

Alternatively, as shown in FIG. 13, a central position of the loop antenna 113 is connected to the coplanar stripline 1131, and an end of the coplanar stripline 1131 is connected to the open-circuit stub 1132. The central position of the loop antenna 113 is also the feedpoint of the loop antenna 113. By using this structure, the coplanar stripline 1131 and the open-circuit stub 1132 form the SLCPS resonator. The SLCPS resonator and the loop antenna 113 are combined at a feedpoint position, so that the loop antenna 113 is modified to a new antenna with a decoupling effect.

Figure 14:
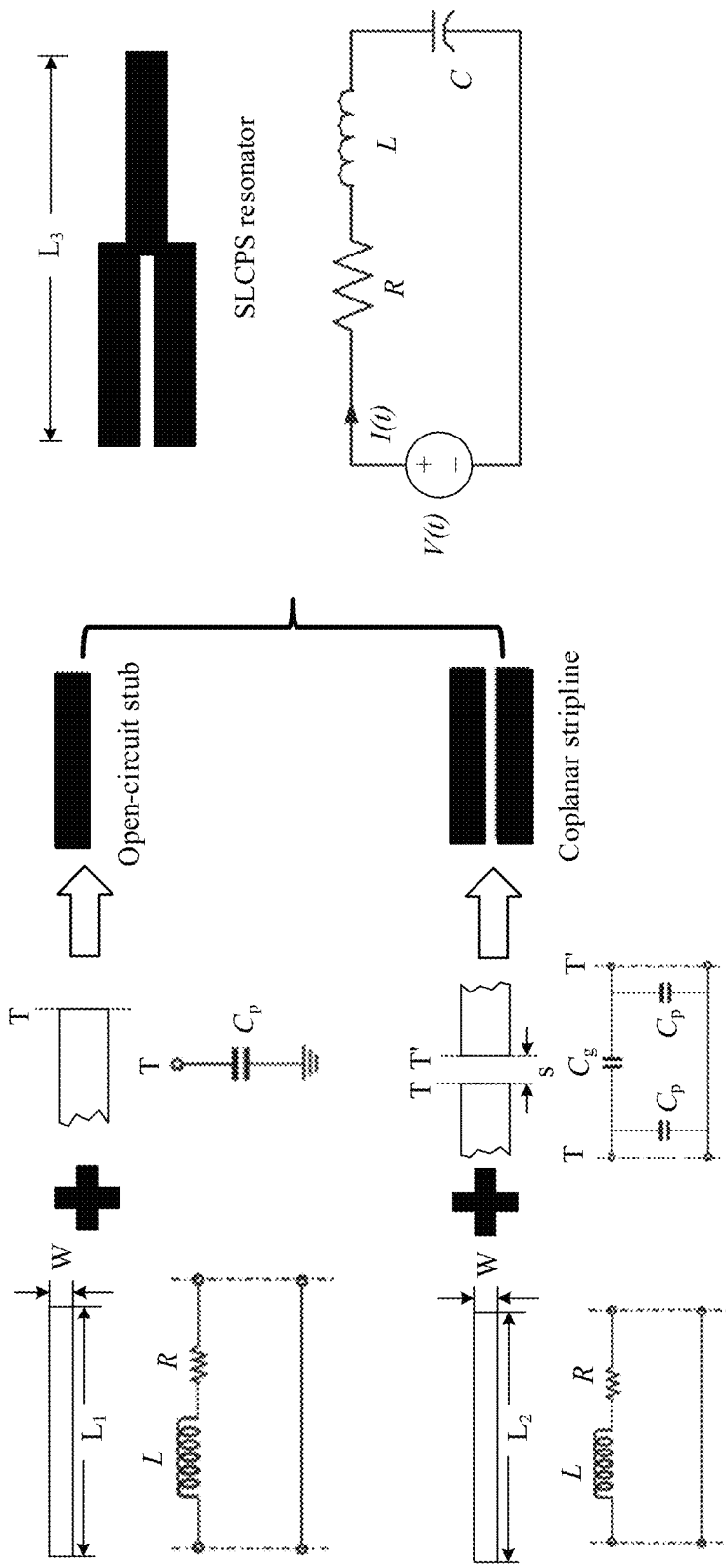
FIG. 14 is a diagram of an original structure evolution process of an SLCPS resonator according to an embodiment of this application.

A structure of the SLCPS resonator includes a transmission line and an open-circuit stub that is connected to an end of the transmission line, so that a strong resonance effect can be generated, thereby improving a decoupling effect. For example, refer to FIG. 14. FIG. 14 is an example of an evolution process of an original structure of an SLCPS resonator, and a coplanar stripline shown in FIG. 14 are an example of a transmission line. FIG. 14 shows the evolution process of the original structure of the SLCPS resonator. It can be seen from FIG. 14 that an open-circuit stub with a specific length has an effect of forming series LC resonance, and a coplanar stripline with a specific length also has an effect of forming series LC resonance. The SLCPS resonator may be formed by loading an open-circuit stub after an end of the coplanar stripline is short-circuited, and has a stronger series LC resonance effect. Therefore, the SLCPS resonator can implement decoupling.

In FIG. 14, $L_1$ represents a total transverse length of the open-circuit stub 1132, $L_2$ represents a total transverse length of the coplanar stripline 1131, and $L_3$ represents a total transverse length of the SLCPS resonator. T and T' represent two opposite tangent planes in the coplanar stripline 1131, and s represents a distance between the two opposite tangent planes in the coplanar stripline 1131.

In one embodiment, a total transverse length of the transmission line and the open-circuit stub 1132 is 0.8 to 1.2 times an operating wavelength of the first antenna 11 or the second antenna 12. For example, the total transverse length of the transmission line and the open-circuit stub 1132 is 0.9 to 1.1 times the operating wavelength of the first antenna 11 or the second antenna 12. For example, the total transverse length of the transmission line and the open-circuit stub 1132 is 1 times the operating wavelength of the first antenna 11 or the second antenna 12. In other words, the total transverse length of the transmission line and the open-circuit stub 1132 is the same as the operating wavelength of the first antenna 11 or the second antenna 12. The operating wavelength of the first antenna 11 herein is, for example, an operating wavelength in a medium of the first antenna 11. The operating wavelength of the second antenna 12 is, for example, an operating wavelength in a medium of the second antenna 12.

The total transverse length of the transmission line and the open-circuit stub 1132 may also be referred to as a length of the decoupling resonator 111c. For example, refer to FIG. 14. A total transverse length of the coplanar stripline 1131 and the open-circuit stub 1132 may also be referred to as a length of the SLCPS resonator.

The total transverse length of the transmission line and the open-circuit stub 1132 is, for example, a total length from the feedpoint 115 of the first antenna 11 to an end of the open-circuit stub 1132. The total transverse length of the transmission line and the open-circuit stub 1132 is greater than each length of the transmission line and the open-circuit stub 1132. The total transverse length of the transmission line and the open-circuit stub 1132 is less than or equal to a sum of lengths of the transmission line and the open-circuit stub 1132. For example, refer to FIG. 14. In FIG. 14, $L_3$ is greater than $L_1$, $L_3$ is greater than $L_2$, and $L_3$ is less than or equal to a sum of $L_1$ and $L_2$.

In one embodiment, the total transverse length of the transmission line and the open-circuit stub 1132 is determined based on the operating wavelength of the first antenna 11 or the second antenna 12. In one embodiment, the total transverse length of the transmission line and the open-circuit stub 1132 is obtained through adjustment on the basis of the operating wavelength of the first antenna 11 or the second antenna 12. For example, a process of determining the total transverse length of the transmission line and the open-circuit stub 1132 includes: performing fine adjustment based on a requirement by using the operating wavelength of the first antenna 11 or the second antenna 12 as a center, and using a value obtained after the adjustment as the total transverse length of the transmission line and the open-circuit stub 1132. For example, 1 times the operating wavelength of the first antenna 11 or the second antenna 12 is used as the center, the operating wavelength is adjusted leftward or rightward by 0.2 times. A minimum value obtained after the adjustment to the left is as follows: 1 times the operating wavelength −0.2 times the operating wavelength=0.8 times the operating wavelength. A minimum value obtained after the adjustment to the right is as follows: 1 times the operating wavelength+0.2 times the operating wavelength=1.2 times the operating wavelength. Therefore, the total transverse length of the transmission line and the open-circuit stub 1132 is 0.8 to 1.2 times the operating wavelength.

When the total transverse length of the transmission line and the open-circuit stub 1132 falls within the value ranges described above, a decoupling effect can be improved. Specifically, for the first antenna 11, when the total transverse length of the open ended stub 1132 and the coplanar stripline 1131 is approximately equal to an operating wavelength in a medium of the first antenna 11, the SLCPS resonator can resonate at a corresponding frequency, a resonance mode between the first antenna 11 and the second antenna 12 is enhanced, and an LC resonance effect formed by the SLCPS resonator has a good decoupling effect. The corresponding frequency is a frequency in a target frequency band, and the corresponding frequency is, for example, a frequency in the operating frequency band of the vertical polarization antenna (the second antenna 12).

In one embodiment, the decoupling resonator 111c is applicable to a scenario in which the first antenna 11 and the second antenna 12 have different operating frequency bands. The decoupling resonator 111c can be used to implement an inter-frequency decoupling effect, so that the isolation between the first antenna 11 and the second antenna 12 is improved when the first antenna 11 and the second antenna 12 work in different frequency bands.

Figure 15:
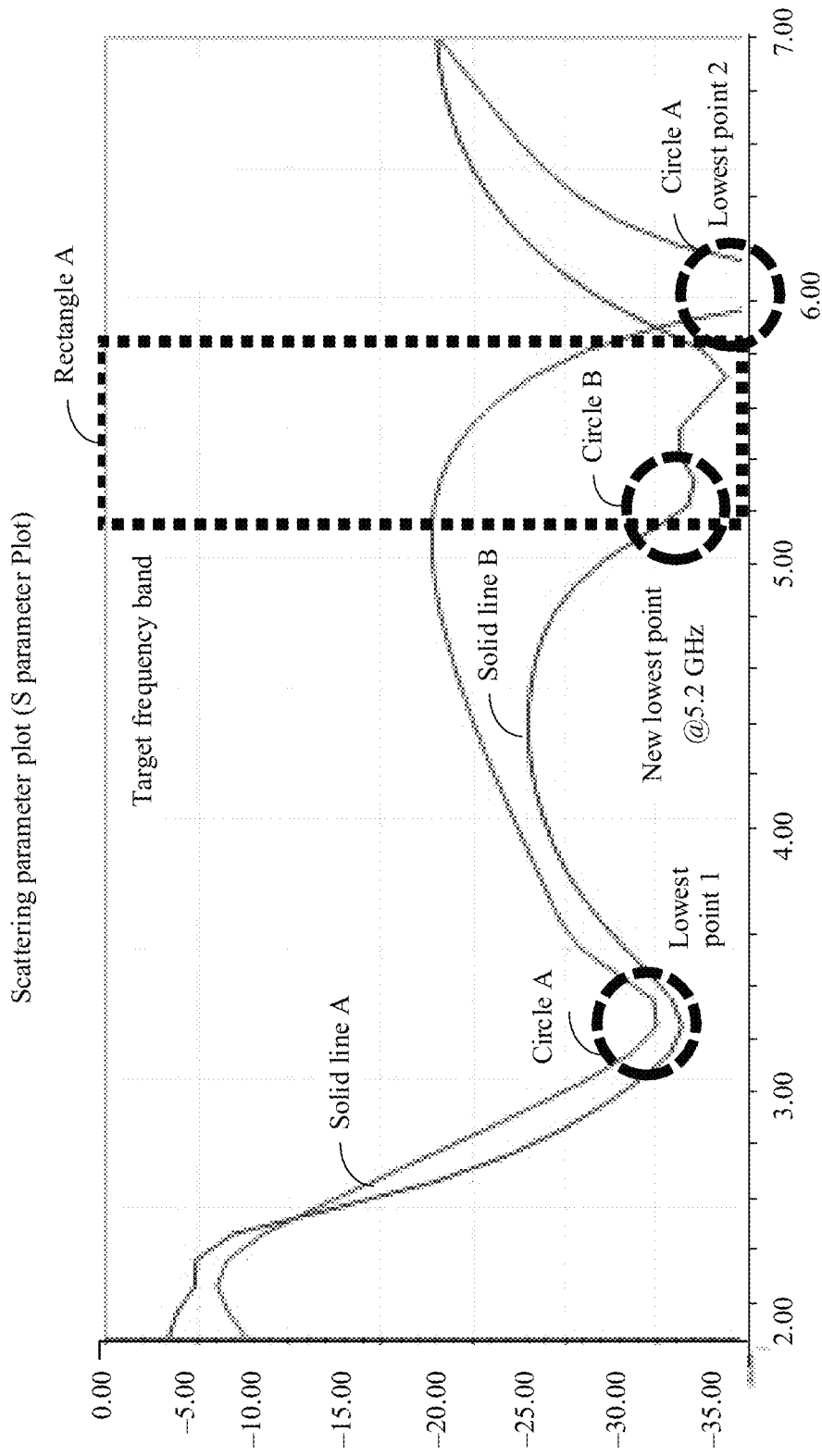
FIG. 15 is a diagram of a simulation result of an effect of loading an SLCPS resonator on isolation according to an embodiment of this application.
Figure 16:
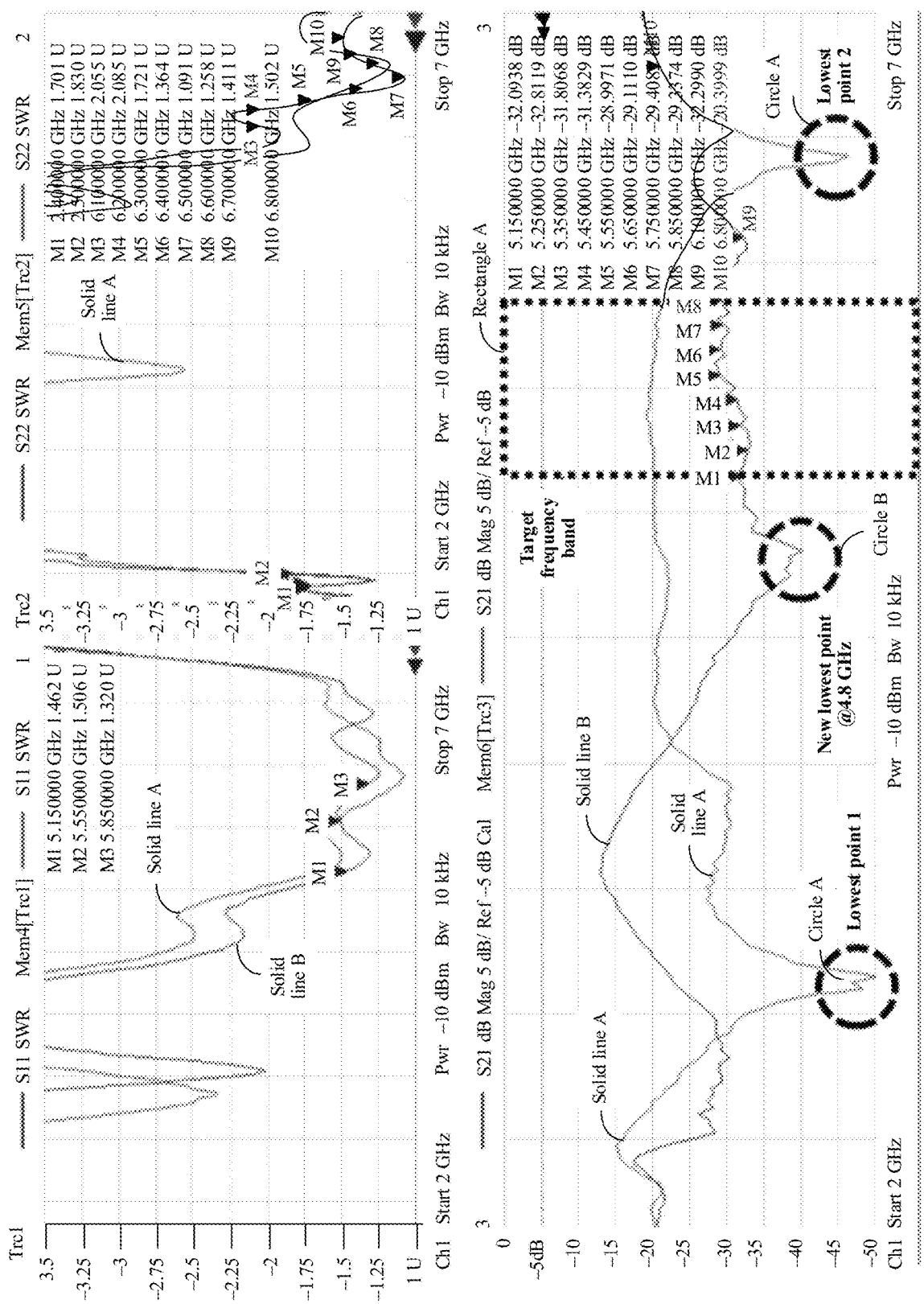
FIG. 16 is a diagram of a test result of an effect of loading an SLCPS resonator on isolation according to an embodiment of this application.

For example, refer to FIG. 15 and FIG. 16. FIG. 15 and FIG. 16 are diagrams of simulation results of impact of loading an SLCPS resonator (namely, the decoupling resonator 111c) with one open-circuit stub 1132 on isolation. FIG. 15 and FIG. 16 are described by using an example in which the first antenna 11 and the second antenna 12 work in different frequency bands. In FIG. 15 and FIG. 16, an example in which a target frequency band is 5.15 GHz to 5.85 GHz is used for description.

As shown in FIG. 15, a solid line A represents an original isolation (namely, isolation when no SLCPS resonator is loaded) simulation result. It can be seen that in a frequency range of 2 GHz to 7 GHz, there are two lowest isolation points, that is, lowest point 1 and lowest point 2 circled by two circles A. It can be seen that frequencies near the two lowest points are relatively high, and isolation between antennas is relatively high. However, when the solid line A is in WLAN operating frequency band 5.15 GHz to 5.85 GHz (the target frequency band for isolation improvement) corresponding to rectangle A, the isolation between antennas is relatively poor. Especially, the isolation at lowest frequency 5.15 GHz is only about 17 dB. A solid line B represents a simulation result of isolation S21 between the antennas after the SLCPS resonator is loaded. A new lowest isolation point is generated at frequencies near 5.2 GHz circled by a circle B on the solid line B, and further, isolation between the antennas in the target frequency band is improved by about 13 dB.

As shown in FIG. 16, a solid line A represents an original isolation test result. It can be seen that in a frequency range of 2 GHz to 7 GHz, there are two main lowest isolation points, that is, lowest point 1 and lowest point 2 circled by two circles A. It can be seen that frequencies near the two lowest points are relatively high, and isolation between antennas is relatively high. However, when the solid line A is in WLAN operating frequency band 5.15 GHz to 5.85 GHz (the target frequency band for isolation improvement) corresponding to rectangle A, the isolation between antennas is relatively poor. Especially, the isolation at lowest frequency 5.15 GHz is only about 19 dB. A solid line B represents a test result of isolation S21 between the antennas after the SLCPS resonator is loaded. A new lowest isolation point is generated at 4.8 GHz circled by a circle B on the solid line B, and further, isolation between the antennas in the target frequency band is improved by about 10 dB. In addition, a standing wave of the two antennas is still within 2.0. Radiation performance is basically not affected.

The upper part of the figure in FIG. 16 includes markers M1 (5.150000 GHz, 1.462 U), M2 (5.550000 GHz, 1.506 U), M3 (5.850000 GHz, 1.320 U), M1 (2.40000 GHz, 1.701 U), M2 (2.50000 GHz, 1.830 U), M3 (6.10000 GHz, 2.055 U), M4 (6.20000 GHz, 2.085 U), M5 (6.30000 GHz, 1.721 U), M6 (6.40000 GHz, 1.364 U), M7 (6.50000 GHz, 1.091 U), M8 (6.60000 GHz, 1.258 U), M9 (6.70000 GHz, 1.411 U), and M10 (6.80000 GHz, 1.502 U). The lower part of the figure in FIG. 16 includes markers M1 (5.150000 GHz, −32.0938 dB), M2 (5.250000 GHz, −32.8119 dB), M3 (5.350000 GHz, −31.8068 dB), M4 (5.450000 GHz, −31.3829 dB), M5 (5.550000 GHz, −28.9971 dB), M6 (5.650000 GHz, −29.1110 dB), M7 (5.750000 GHz, −29.4082 dB), M8 (5.850000 GHz, −29.3373 dB), M9 (6.1 GHz, −32.2990 dB), and M10 (6.8 GHz, −20.3998 dB).

The foregoing describes, by using the decoupling resonator 111c, possible embodiments of constructing a decoupling resonator by using a transmission line and one open-circuit stub as an example. The following describes, by using the decoupling resonator 114, possible embodiments of constructing a decoupling resonator by using a transmission line and a plurality of open-circuit stubs as an example.

Figure 17:
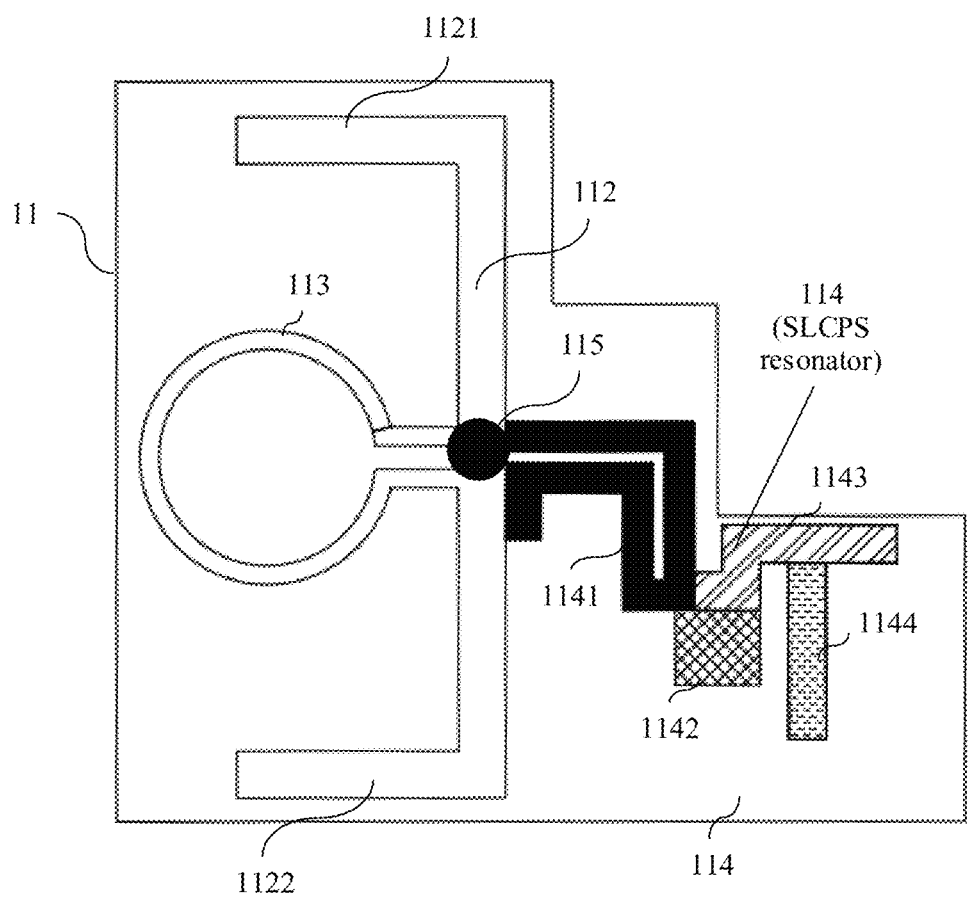
FIG. 17 is a diagram of a decoupling resonator implemented by using an SLCPS resonator according to an embodiment of this application.

The decoupling resonator 114 is implemented by using the transmission line and the plurality of open-circuit stubs. Specifically, the decoupling resonator 114 includes a plurality of open-circuit stubs connected in parallel and the transmission line. FIG. 17 shows an example in which the decoupling resonator 114 includes three parallel open-circuit stubs. The three open-circuit stubs are, for example, an open-circuit stub 1142, an open-circuit stub 1143, and an open-circuit stub 1144.

The transmission line is connected to the feedpoint 115 of the first antenna 11. In one embodiment, the transmission line is a coplanar stripline 1141 or a slotline. FIG. 17 shows an example in which the transmission line is the coplanar stripline 1141.

Each of the plurality of open-circuit stubs is connected to an end of the transmission line. In other words, the end of the transmission line is loaded with the plurality of open-circuit stubs. In one embodiment, lengths of the plurality of open-circuit stubs are different from each other.

For example, refer to FIG. 17. FIG. 17 shows an example of adding the decoupling resonator 114 to the horizontal polarization antenna in the antenna system 10 shown in FIG. 2, FIG. 3, or FIG. 4. The open-circuit stub 1142, the open-circuit stub 1143, and the open-circuit stub 1144 in FIG. 17 are examples for describing the plurality of open-circuit stubs in the decoupling resonator 114. The open-circuit stub 1142, the open-circuit stub 1143, and the open-circuit stub 1144 are integrally a stepped impedance matching stub. The open-circuit stub 1142, the open-circuit stub 1143, and the open-circuit stub 1144 are all connected to an end of the coplanar stripline 1141. For example, length of the open-circuit stub 1144 is greater than length of the open-circuit stub 1143, and length of the open-circuit stub 1143 is greater than length of the open-circuit stub 1142.

In one embodiment, the decoupling resonator 114 is an SLCPS resonator. The SLCPS resonator includes the plurality of open-circuit stubs connected in parallel and the coplanar stripline 1141. The coplanar stripline 1141 in the SLCPS resonator is connected to the feedpoint 115 of the first antenna 11. In one embodiment, a short circuit is first formed on the end of the coplanar stripline 1141, and then the plurality of open-circuit stubs are connected to the end of the coplanar stripline 1141 in parallel, to form the SLCPS resonator. A form of the SLCPS resonator is, for example, a metal patch.

When the first antenna 11 is the dipole antenna 112, a structure of the SLCPS resonator is, for example, that a feedpoint of the dipole antenna 112 is connected to the coplanar stripline 1141, and the end of the coplanar stripline 1141 is connected to a plurality of parallel open-circuit stubs.

When the first antenna 11 is the loop antenna 113, a structure of the SLCPS resonator is, for example, that a feedpoint of the loop antenna 113 is connected to the coplanar stripline 1141, and the end of the coplanar stripline 1141 is connected to a plurality of parallel open-circuit stubs.

When the first antenna 11 is a combination of the dipole antenna 112 and the loop antenna 113, a structure of the SLCPS resonator is, for example, that a common feedpoint of the dipole antenna 112 and the loop antenna 113 is connected to the coplanar stripline 1141, and the end of the coplanar stripline 1141 is connected to a plurality of parallel open-circuit stubs.

In one embodiment, the decoupling resonator 114 has a plurality of resonance frequencies, the plurality of resonance frequencies are different, and the plurality of resonance frequencies are separately within an operating band of the first antenna 11 and an operating band of the second antenna 12. For example, the decoupling resonator 114 has a first resonance frequency and a second resonance frequency. The first resonance frequency is within the operating frequency band of the first antenna 11. The second resonance frequency is within the operating frequency band of the second antenna 12. Therefore, the decoupling resonator 114 can not only resonate in the operating frequency band of the second antenna 12, but also resonate in the operating frequency band of the first antenna 11. The decoupling resonator 114 has a plurality of resonance frequencies. This helps achieve a multi-band resonance decoupling effect. In one embodiment, the plurality of resonance frequencies of the decoupling resonator 114 are adjacent. By using the plurality of adjacent resonance frequencies, the decoupling resonator 114 can work in a wider frequency band. This helps achieve a resonance decoupling effect of a broad frequency band.

In one embodiment, the plurality of resonance frequencies of the decoupling resonator 114 respectively correspond to the plurality of open-circuit stubs included in the decoupling resonator 114. For example, each open-circuit stub in the decoupling resonator 114 corresponds to one resonance frequency of the decoupling resonator 114. Different open-circuit stubs in the decoupling resonator 114 correspond to different resonance frequencies. In one embodiment, referring to FIG. 17, the open-circuit stub 1142, the open-circuit stub 1143, and the open-circuit stub 1144 are connected to the end of the coplanar stripline 1141. The coplanar stripline 1141 and the open-circuit stub 1142 have a resonance frequency f1. The coplanar stripline 1141 and the open-circuit stub 1143 have a resonance frequency f2. The coplanar stripline 1141 and the open-circuit stub 1144 have a resonance frequency f3. The resonance frequency f1, the resonance frequency f2, and the resonance frequency f3 are three adjacent frequencies. Therefore, because a resonance frequency band of the decoupling resonator 114 covers the three adjacent frequencies, the resonance decoupling effect of the broad frequency band is achieved.

In one embodiment, different resonance frequencies of the decoupling resonator 114 are implemented by using open-circuit stubs of different lengths. For example, the decoupling resonator 114 includes a first open-circuit stub and a second open-circuit stub. The first open-circuit stub and the second open-circuit stub are connected in parallel. Both the first open-circuit stub and the second open-circuit stub are connected to the end of the coplanar stripline 1141. For example, refer to FIG. 17. The first open-circuit stub and the second open-circuit stub are any two different open-circuit stubs in the open-circuit stub 1142, the open-circuit stub 1143, and the open-circuit stub 1144.

A total transverse length of the transmission line and the first open-circuit stub is 0.8 to 1.2 times an operating wavelength of the first antenna 11. A total transverse length of the transmission line and the second open-circuit stub is 0.8 to 1.2 times an operating wavelength of the second antenna 12. In one embodiment, the total transverse length of the transmission line and the first open-circuit stub is 0.9 to 1.1 times the operating wavelength of the first antenna 11. The total transverse length of the transmission line and the second open-circuit stub is 0.9 to 1.1 times the operating wavelength of the second antenna 12. In one embodiment, the total transverse length of the transmission line and the first open-circuit stub is 1 times the operating wavelength of the first antenna 11. The total transverse length of the transmission line and the second open-circuit stub is 1 times the operating wavelength of the second antenna 12. In other words, the total transverse length of the transmission line and the first open-circuit stub is the same as the operating wavelength of the first antenna 11. The total transverse length of the transmission line and the second open-circuit stub is the same as the operating wavelength of the second antenna 12.

Coupling of frequencies in the operating frequency band of the first antenna 11 can be suppressed by using a structure of the transmission line and the first open-circuit stub, and coupling of frequencies in the operating frequency band of the second antenna 12 can be suppressed by using a structure of the transmission line and the second open-circuit stub. Therefore, the coupling of the frequencies of the first antenna 11 and the coupling of the frequencies of the second antenna 12 can be suppressed, so that a better decoupling effect is achieved. The operating wavelength of the first antenna 11 herein is, for example, an operating wavelength in a medium of the first antenna 11. The operating wavelength of the second antenna 12 is, for example, an operating wavelength in a medium of the second antenna 12.

In one embodiment, the total transverse length of the transmission line and the first open-circuit stub is determined based on the operating wavelength of the first antenna 11. In one embodiment, the total transverse length of the transmission line and the first open-circuit stub is obtained through adjustment on the basis of the operating wavelength of the first antenna 11. For example, a process of determining the total transverse length of the transmission line and the first open-circuit stub includes: performing fine adjustment based on a requirement by using the operating wavelength of the first antenna 11 as a center, and using a value obtained after the adjustment as the total transverse length of the transmission line and the first open-circuit stub.

In one embodiment, the total transverse length of the transmission line and the second open-circuit stub is determined based on the operating wavelength of the second antenna 12. In one embodiment, the total transverse length of the transmission line and the second open-circuit stub is obtained through adjustment on the basis of the operating wavelength of the second antenna 12. For example, a process of determining the total transverse length of the transmission line and the second open-circuit stub includes: performing fine adjustment based on a requirement by using the operating wavelength of the second antenna 12 as a center, and using a value obtained after the adjustment as the total transverse length of the transmission line and the second open-circuit stub.

The process of determining the total transverse length of the transmission line and the first open-circuit stub is used as an example. For example, 1 times the operating wavelength of the first antenna 11 is used as the center, the operating wavelength is adjusted leftward or rightward by 0.2 times. A minimum value obtained after the adjustment to the left is as follows: 1 times the operating wavelength of the first antenna 11 −0.2 times the operating wavelength of the first antenna 11=0.8 times the operating wavelength of the first antenna 11. A minimum value obtained after the adjustment to the right is as follows: 1 times the operating wavelength of the first antenna 11+0.2 times the operating wavelength of the first antenna 11=1.2 times the operating wavelength of the first antenna 11. Therefore, the total transverse length of the transmission line and the first open-circuit stub is 0.8 to 1.2 times the operating wavelength of the first antenna 11. The process of determining the total transverse length of the transmission line and the second open-circuit stub is similar to this process.

In one embodiment, the plurality of open-circuit stubs in the decoupling resonator 114 include only two open-circuit stubs: the first open-circuit stub and the second open-circuit stub. Alternatively, the plurality of open-circuit stubs in the decoupling resonator 114 not only include two open-circuit stubs: the first open-circuit stub and the second open-circuit stub, but also include another open-circuit stub other than the first open-circuit stub and the second open-circuit stub. A quantity of open-circuit stubs in the decoupling resonator 114 is not limited in the embodiments.

In one embodiment, the decoupling resonator 114 further includes a third open-circuit stub. The third open-circuit stub and the first open-circuit stub are connected in parallel. The third open-circuit stub and the second open-circuit stub are connected in parallel. The third open-circuit stub is connected to the end of the coplanar stripline 1141. For example, refer to FIG. 17. The third open-circuit stub is an open-circuit stub other than the first open-circuit stub and the second open-circuit stub in the open-circuit stub 1142, the open-circuit stub 1143, and the open-circuit stub 1144.

In one embodiment, a total transverse length of the transmission line and the third open-circuit stub is 0.8 to 1.2 times the operating wavelength of the first antenna 11. In one embodiment, a resonance frequency of the transmission line and the third open-circuit stub, and a resonance frequency of the transmission line and the first open-circuit stub are two adjacent frequencies. For example, the total transverse length of the transmission line and the first open-circuit stub is 0.8 times to 1 times the operating wavelength of the first antenna 11. The total transverse length of the transmission line and the third open-circuit stub is 1 times to 1.2 times the operating wavelength of the first antenna 11. This manner helps achieve a broadband resonance decoupling effect in the operating frequency band of the first antenna 11. A process of determining the total transverse length of the transmission line and the third open-circuit stub is similar to the process of determining the total transverse length of the transmission line and the first open-circuit stub, and details are not described herein.

In one embodiment, the total transverse length of the transmission line and the third open-circuit stub is 0.8 to 1.2 times the operating wavelength of the second antenna 12. In one embodiment, a resonance frequency of the transmission line and the third open-circuit stub, and a resonance frequency of the transmission line and the second open-circuit stub are two adjacent frequencies. For example, the total transverse length of the transmission line and the second open-circuit stub is 0.8 times to 1 times the operating wavelength of the second antenna 12. The total transverse length of the transmission line and the third open-circuit stub is 1 times to 1.2 times the operating wavelength of the second antenna 12. This manner helps achieve a broadband resonance decoupling effect in the operating frequency band of the second antenna 12. A process of determining the total transverse length of the transmission line and the third open-circuit stub is similar to the process of determining the total transverse length of the transmission line and the second open-circuit stub, and details are not described herein.

In one embodiment, the decoupling resonator 114 is applicable to a scenario in which the first antenna 11 and the second antenna 12 have a same operating frequency band. The decoupling resonator 114 can be used to implement an intra-frequency decoupling effect, so that the isolation between the first antenna 11 and the second antenna 12 is improved when the first antenna 11 and the second antenna 12 work in the same frequency band. For example, the decoupling resonator 114 is applicable to a case in which two antennas: the horizontal polarization antenna and the vertical polarization antenna work in a common operating frequency band, and the common operating frequency band is, for example, 6.1 GHz to 6.5 GHz.

Figure 18:
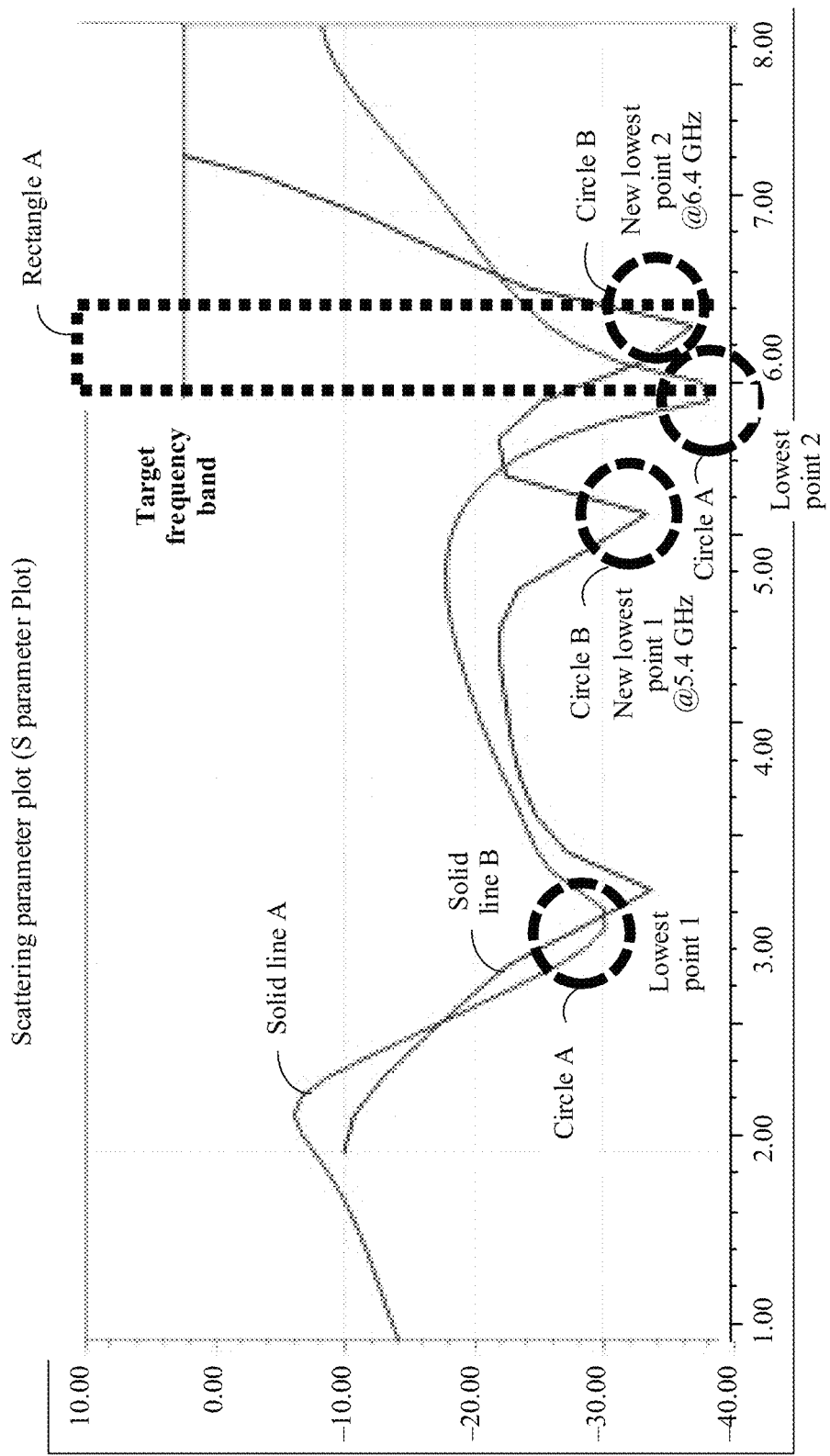
FIG. 18 is a diagram of a simulation result of an effect of loading an SLCPS resonator on isolation according to an embodiment of this application.
Figure 19:
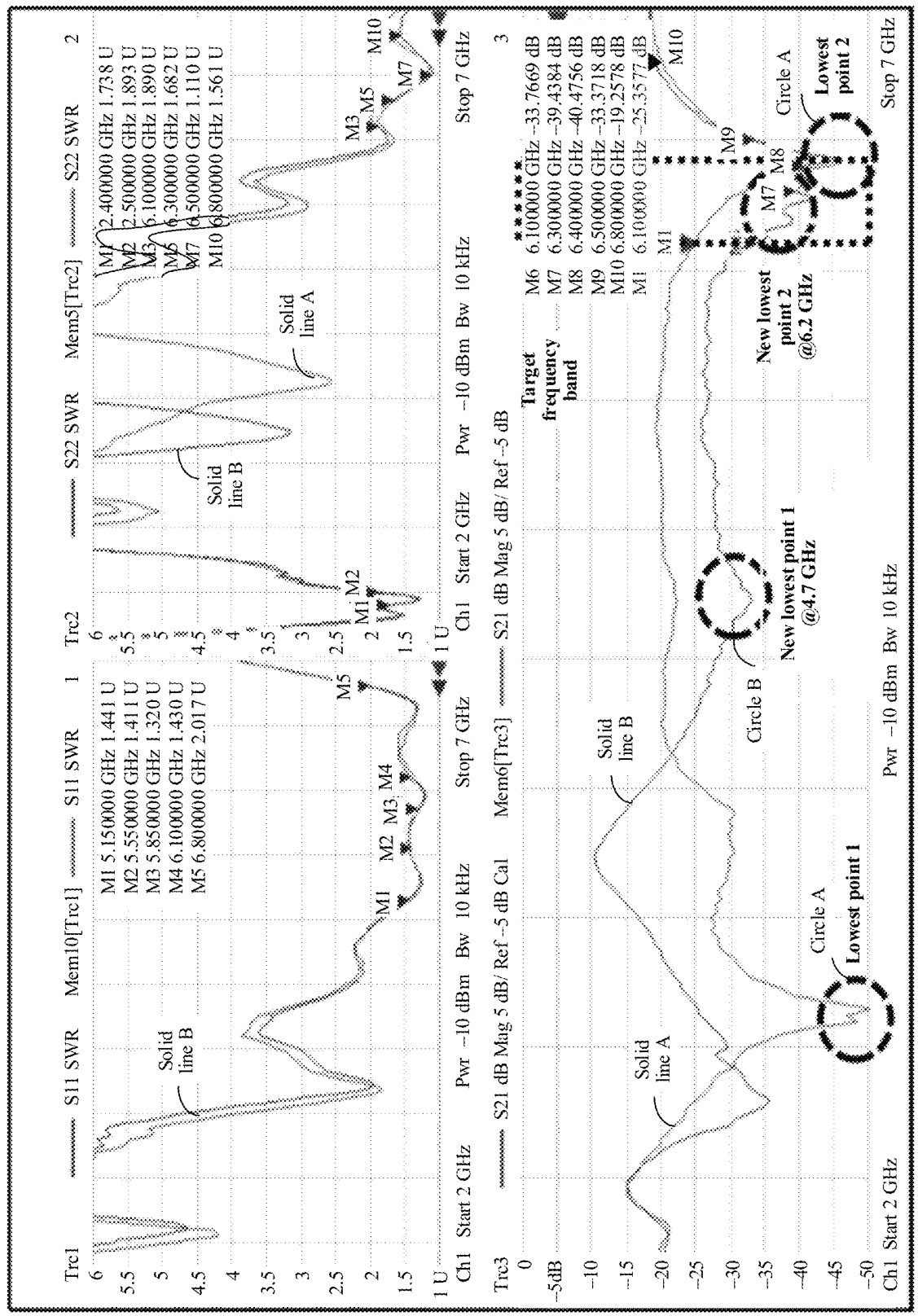
FIG. 19 is a diagram of a test result of an effect of loading an SLCPS resonator on isolation according to an embodiment of this application.

For example, refer to FIG. 18 and FIG. 19. FIG. 18 and FIG. 19 are diagrams of simulation results of impact of loading an SLCPS resonator (namely, the decoupling resonator 114) with a plurality of open-circuit stubs on isolation. FIG. 18 and FIG. 19 are described by using an example in which the first antenna 11 and the second antenna 12 work in a same frequency band. In FIG. 18 and FIG. 19, an example in which a target frequency band is 6.1 GHz to 6.5 GHz is used for description.

As shown in FIG. 18, a solid line A represents an original isolation (namely, isolation when no SLCPS resonator is loaded) simulation result. It can be seen that in a frequency range of 2 GHz to 7 GHz, there are two lowest isolation points, that is, lowest point 1 and lowest point 2 circled by circles A. It can be seen that frequencies near the two lowest points are relatively high, and isolation between antennas is relatively high. However, when the solid line A is in a common operating frequency band 6.1 GHz to 6.5 GHz (a target frequency band for isolation improvement) of the horizontal polarization antenna and the vertical polarization antenna corresponding to rectangle A, the isolation between antennas is relatively poor. Especially, the isolation at highest frequency 6.5 GHz is only about 24 dB. A solid line B represents a simulation result of isolation S21 between the antennas after the decoupling resonator 114 is loaded. A new lowest isolation point is generated at frequencies near 5.4 GHz and 6.4 GHz circled by circles B on the solid line B, and further, isolation between the antennas in the target frequency band is improved by about 8.6 dB.

As shown in FIG. 19, a solid line A represents an original isolation (namely, isolation when no SLCPS resonator is loaded) test result. It can be seen that in a frequency range of 2 GHz to 7 GHz, there are two main lowest isolation points, that is, lowest point 1 and lowest point 2 circled by circles A. It can be seen that frequencies near the two lowest points are relatively high, and isolation between antennas is relatively high. However, when the solid line A is in a common operating frequency band 6.1 GHz to 6.5 GHz (a target frequency band for isolation improvement) of the horizontal polarization antenna and the vertical polarization antenna corresponding to rectangle A, the isolation between antennas is relatively poor. Especially, the isolation at lowest frequency 6.1 GHz is only about 25.4 dB. A solid line B represents a test result of isolation S21 between the antennas after the decoupling resonator 114 is loaded. A new lowest isolation point is generated at 4.7 GHz and 6.2 GHz circled by circles B on the solid line B, and further, isolation between the antennas in the target frequency band is improved by about 8 dB. In addition, a standing wave of the two antennas is still within 2.0. Radiation performance is basically not affected.

The upper part of the figure in FIG. 19 includes markers M1 (5.150000 GHz, 1.441 U), M2 (5.550000 GHz, 1.411 U), M3 (5.850000 GHz, 1.320 U), M4 (6.10000 GHz, 1.430 U), M5 (6.80000 GHz, 2.017 U), M1 (2.40000 GHz, 1.738 U), M2 (2.50000 GHz, 1.893 U), M3 (6.10000 GHz, 1.890 U), M5 (6.30000 GHz, 1.682 U), M7 (6.50000 GHz, 1.110 U), and M10 (6.80000 GHz, 1.561 U). The lower part of the figure in FIG. 19 includes markers M6 (6.10000 GHz, −33.7669 dB), M7 (6.350000 GHz, −39.4384 dB), M8 (6.40000 GHz, −40.4756 dB), M9 (6.5 GHz, 33.3713 dB), M10 (6.8 GHz, −19.2578 dB), and M1 (6.1 GHz, −25.3577 dB).

The foregoing describes, by using the decoupling resonator 111, the decoupling resonator 111b, the decoupling resonator 111c, and the decoupling resonator 114, embodiments of the decoupling resonator provided in the embodiments of this application. Table 1 shows effect comparison in simulation results or test results of the embodiments of the decoupling resonator 111, the decoupling resonator 111b, the decoupling resonator 111c, and the decoupling resonator 114. The decoupling resonator 111, the decoupling resonator 111b, and the decoupling resonator 111c are decoupling resonators suitable for inter-frequency decoupling. In comparison, the decoupling resonator 111c achieves an optimal decoupling effect. The decoupling resonator 114 is a decoupling resonator applicable for intra-frequency decoupling, and has a relatively good intra-frequency isolation improvement effect. For MIMO communication, a higher isolation between antennas indicates a smaller correlation between the antennas. In a case of a same signal-to-noise ratio (signal-to-noise ratio, SNR), a bit error rate is lower, a diversity gain is higher, and a channel capacity is higher. In terms of a circuit volume, the decoupling resonator 111, the decoupling resonator 111b, the decoupling resonator 111c, and the decoupling resonator 114 are all implemented within a size constraint range of a coplanar printed circuit board (printed circuit board, PCB). An overall size of the dual-polarized antenna system is not increased, costs are low, and isolation is good.

TABLE 1

| Decoupling resonator | Technical solution | Inter-frequency decoupling (simulation/test, improved dB) | Intra-frequency decoupling (simulation/test, improved dB) | Circuit complexity | Effects |
|---|---|---|---|---|---|
| Decoupling resonator 111 | SIR | 4/3.5 | — | Easy | Average |
| Decoupling resonator 111b | RR | 4/3.5 | — | Medium | Average |
| Decoupling resonator 111c and decoupling resonator 114 | SLCPS | 13/10 | 8.6/8 | Difficult | Good |

The foregoing describes the antenna system 10 provided in the embodiments of this application. The following describes a wireless device in the embodiments of this application. The wireless device has any function of the foregoing antenna system 10.

The wireless device includes at least one antenna system 10. In one embodiment, when the wireless device includes a plurality of antenna systems 10, types of decoupling resonators in different antenna systems 10 in the wireless device are the same. For example, decoupling resonators in each antenna system 10 in the wireless device are all decoupling resonators 111, or are all decoupling resonators 111b, or are all decoupling resonators 113. In one embodiment, when the wireless device includes a plurality of antenna systems 10, types of decoupling resonators in different antenna systems 10 in the wireless device are different. For example, the wireless device includes a first antenna 11 system 10 and a second antenna 12 system 10. A decoupling resonator in the first antenna 11 system 10 is any one of the decoupling resonator 111, the decoupling resonator 111b, and the decoupling resonator 111c. A decoupling resonator in the second antenna 12 system 10 is the decoupling resonator 114. In this way, the wireless device can improve isolation between antennas when the antennas work in different frequency bands by using the decoupling resonator 111, the decoupling resonator 111b, or the decoupling resonator 111c. The wireless device can improve isolation between antennas when the antennas work in a same frequency band by using the decoupling resonator 114. In this way, the isolation can be improved both when the antennas work in different frequency bands and in a same frequency band.

In one embodiment, the wireless device is an AP device.

In one embodiment, the wireless device is user equipment or a network side device.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as Radio Access Network (RAN)). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal (Access Terminal), a user terminal), a user agent, a user device (User Device), or a user equipment.

The network side device may be, for example, a base station, or may be a relay device, or may be another network side device. The base station (for example, an access point) may refer to a device in communication with the wireless terminal through one or more sectors at an air interface in an access network. The base station may be configured to mutually convert a received over-the-air frame and an IP packet and serve as a router between the wireless terminal and a rest portion of the access network. The rest portion of the access network may include an internet protocol (IP) network. The base station may coordinate attribute management on the air interface. For example, the base station may be a base transceiver station (BTS) in GSM or CDMA, or may be a base station (NodeB) in WCDMA, or may be an evolved NodeB (NodeB, eNB, or e-NodeB) in LTE. This is not limited in this application.

The wireless device described in this specification may be applied to various communications systems, for example, current 2G and 3G communications systems and a next-generation communications system, for example, a global system for mobile communications (GSM), a code division multiple access (CDMA) system, a time division multiple access (TDMA) system, a wideband code division multiple access (WCDMA), a frequency division multiple access (FDMA) system, an orthogonal frequency division multiple access (OFDMA) system, a single-carrier FDMA (SC-FDMA) system, a general packet radio service (GPRS) system, a long term evolution (LTE) system, and another communications system of this type.

Persons of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by the hardware or the software depends on particular applications and design constraint conditions of the technical solutions. Persons of ordinary skill in the art may use different methods to implement the described functions for each particular application, but it should not be considered that the implementation goes beyond the scope of this application.

In the embodiments of this application, terms such as "first" and "second" are used to distinguish same items or similar items that have basically same functions. It should be understood that there is no logical or time sequence dependency between "first" and "second", and a quantity and an execution sequence are not limited. It should also be understood that although terms such as first and second are used in the following description to describe various elements, these elements should not be limited by the terms. These terms are merely used to distinguish one element from another element. For example, without departing from the scope of the various examples, a first antenna may also be referred to as a second antenna, and similarly a second antenna may also be referred to as a first antenna. Both the first antenna and the second antenna may be antennas, and in some cases, may be separate and different antennas.

The term "at least one" in this application means one or more, and the term "a plurality of" in this application means two or more. For example, the plurality of open-circuit stubs mean two or more open-circuit stubs.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

Persons of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An antenna system, comprising
a first antenna; and
a second antenna, wherein the first antenna and the second antenna are vertically stacked, wherein the first antenna is superimposed on and directly above the second antenna, wherein the first antenna and the second antenna have a common aperture, wherein a feedpoint of the first antenna and a feedpoint of the second antenna are located on a same vertical line, wherein the first antenna and the second antenna have different polarization directions, wherein the first antenna is connected to a decoupling resonator, and wherein a resonance frequency of the decoupling resonator is within an operating frequency band of the second antenna, to reduce a coupling between the first antenna and the second antenna.

2. The antenna system according to claim 1, wherein the polarization directions of the first antenna and the second antenna are orthogonal.

3. The antenna system according to claim 1, wherein the decoupling resonator is connected to a feedpoint of the first antenna.

4. The antenna system according to claim 1, wherein the decoupling resonator includes a stepped impedance resonator.

5. The antenna system according to claim 4, wherein the first antenna comprises at least one of a dipole antenna or a loop antenna, wherein the first antenna comprises an arm, and wherein a longitudinal width of the stepped impedance resonator is greater than a width of the arm of the first antenna.

6. The antenna system according to claim 4, wherein a transverse length of the stepped impedance resonator is 0.1 to 0.4 times an operating wavelength of the first antenna or the second antenna.

7. The antenna system according to claim 1, wherein the decoupling resonator includes a ring resonator.

8. The antenna system according to claim 7, wherein a circumference of the ring resonator is 0.8 to 1.2 times an operating wavelength of the first antenna or the second antenna.

9. The antenna system according to claim 1, wherein the decoupling resonator comprises a transmission line and an open-circuit stub, and wherein the open-circuit stub is connected to an end of the transmission line.

10. The antenna system according to claim 9, wherein a total transverse length of the transmission line and the open-circuit stub is 0.8 to 1.2 times an operating wavelength of the first antenna or the second antenna.

11. The antenna system according to claim 9, wherein the transmission line includes a coplanar stripline or a slotline.

12. The antenna system according to claim 1, wherein the decoupling resonator comprises a plurality of open-circuit stubs connected in parallel and a transmission line, and wherein each of the plurality of open-circuit stubs is connected to an end of the transmission line.

13. The antenna system according to claim 12, wherein the plurality of open-circuit stubs comprise a first open-circuit stub and a second open-circuit stub, wherein a total transverse length of the transmission line and the first open-circuit stub is 0.8 to 1.2 times an operating wavelength of the first antenna, and wherein a total transverse length of the transmission line and the second open-circuit stub is 0.8 to 1.2 times an operating wavelength of the second antenna.

14. A wireless device comprising
an antenna system, wherein the antenna system comprises
a first antenna; and
a second antenna, wherein the first antenna and the second antenna are vertically stacked, wherein the first antenna is superimposed on and directly above the second antenna, wherein the first antenna and the second antenna have a common aperture, wherein a feedpoint of the first antenna and a feedpoint of the second antenna are located on a same vertical line, wherein the first antenna and the second antenna have different polarization directions, wherein the first antenna is connected to a decoupling resonator, and wherein a resonance frequency of the decoupling resonator is within an operating frequency band of the second antenna, to reduce a coupling between the first antenna and the second antenna.

15. The wireless device according to claim 14, wherein the decoupling resonator is connected to a feedpoint of the first antenna.

16. The wireless device according to claim 14, wherein the decoupling resonator includes a stepped impedance resonator.

17. The wireless device according to claim 16, wherein the first antenna comprises at least one of a dipole antenna or a loop antenna, wherein the first antenna comprises an arm, and wherein a longitudinal width of the stepped impedance resonator is greater than a width of the arm of the first antenna.

18. The wireless device according to claim 16, wherein a transverse length of the stepped impedance resonator is 0.1 to 0.4 times an operating wavelength of the first antenna or the second antenna.

19. The wireless device according to claim 14, wherein the decoupling resonator includes a ring resonator.

20. The wireless device according to claim 14, wherein the decoupling resonator comprises a transmission line and an open-circuit stub, and wherein the open-circuit stub is connected to an end of the transmission line.

* * * * *